United States Patent
Lee et al.

(10) Patent No.: US 10,826,571 B2
(45) Date of Patent: Nov. 3, 2020

(54) GENERATION NODE-B (GNB), USER EQUIPMENT (UE) AND METHODS FOR INTERLEAVING IN MULTIPLE-INPUT MULTIPLE-OUTPUT (MIMO) ARRANGEMENTS

(71) Applicant: Apple Inc., Cupertino, CA (US)

(72) Inventors: Dae Won Lee, Portland, OR (US); Seunghee Han, San Jose, CA (US); Ajit Nimbalker, Fremont, CA (US); Alexei Davydov, Nizhny Novgorod (RU); Paul C. Wei, San Jose, CA (US); Dmitry Dikarev, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/475,733

(22) PCT Filed: Dec. 15, 2017

(86) PCT No.: PCT/US2017/066796
§ 371 (c)(1),
(2) Date: Jul. 3, 2019

(87) PCT Pub. No.: WO2018/128780
PCT Pub. Date: Jul. 12, 2018

(65) Prior Publication Data
US 2019/0334585 A1  Oct. 31, 2019

Related U.S. Application Data

(60) Provisional application No. 62/444,207, filed on Jan. 9, 2017, provisional application No. 62/519,695, filed on Jun. 14, 2017.

(51) Int. Cl.
H04L 5/00 (2006.01)
H04B 7/0413 (2017.01)
H04L 1/00 (2006.01)

(52) U.S. Cl.
CPC ......... *H04B 7/0413* (2013.01); *H04L 1/0071* (2013.01); *H04L 5/0023* (2013.01); *H04L 5/0039* (2013.01)

(58) Field of Classification Search
CPC ... H04B 7/0413; H04L 1/0071; H04L 5/0023; H04L 5/0039
(Continued)

(56) References Cited

U.S. PATENT DOCUMENTS 8,311,008 B2 * 11/2012 Seo ............... H04L 1/0071
                                                370/329
2010/0118800 A1 * 5/2010 Kim .............. H04L 1/0071
                                                370/329
(Continued)

FOREIGN PATENT DOCUMENTS

EP  2879450 A1  6/2015

OTHER PUBLICATIONS

"Codeword to Layer Mapping", Qualcomm Incorporated, R1-1612738, 3GPP TSG-RAN WG1 #87, Reno, Nevada, USA, (Nov. 5, 2016).
(Continued)

*Primary Examiner* — Ted M Wang
(74) *Attorney, Agent, or Firm* — Kowert, Hood, Munyon, Rankin & Goetzel, P.C.

(57) ABSTRACT

Embodiments of a Generation Node-B (gNB), User Equipment (UE) and methods for communication are generally described herein. The gNB may map data symbols to resource elements (REs) of virtual resource blocks (VRBs). The gNB may interleave the data symbols, on a per-VRB basis, to spatial layers of a multi-layer multiple-input mul-
(Continued)

tiple-output (MIMO) transmission. The data symbols may be interleaved based on different interleave patterns of VRB indexes for the spatial layers. The gNB may map the interleaved data symbols of the spatial layers to REs of physical resource blocks (PRBs) for orthogonal frequency division multiplexing (OFDM) transmission.

12 Claims, 30 Drawing Sheets

(58) Field of Classification Search
USPC .......................................................... 375/267
See application file for complete search history.

(56) References Cited

U.S. PATENT DOCUMENTS

| | | |
|---|---|---|
| 2014/0105147 A1 | 4/2014 | Kim et al. |
| 2016/0006551 A1 | 1/2016 | Lee et al. |
| 2016/0192337 A1* | 6/2016 | Wengerter ........... H04B 7/0417 370/329 |

OTHER PUBLICATIONS

"International Application Serial No. PCT/US2017/066796, International Search Report dated Apr. 11, 2018", 8 pgs.
"International Application Serial No. PCT/US2017/066796, Written Opinion dated Apr. 11, 2018", 5 pgs.

* cited by examiner

US 10,826,571 B2

GENERATION NODE-B (GNB), USER EQUIPMENT (UE) AND METHODS FOR INTERLEAVING IN MULTIPLE-INPUT MULTIPLE-OUTPUT (MIMO) ARRANGEMENTS

PRIORITY CLAIM

This application is a U.S. National Stage Filing under 35 U.S.C. 371 from International Application No. PCT/US2017/066796, filed Dec. 15, 2017 and published in English as WO 2018/128780 on Jul. 12, 2018, which claims priority to U.S. Provisional Patent Application Ser. No. 62/444,207, filed Jan. 9, 2017, and to U.S. Provisional Patent Application Ser. No. 62/519,695, filed Jun. 14, 2017, all of which are incorporated herein by reference in their entirety.

TECHNICAL FIELD

Embodiments pertain to wireless communications. Some embodiments relate to wireless networks including 3GPP (Third Generation Partnership Project) networks, 3GPP LTE (Long Term Evolution) networks, and 3GPP LTE-A (LTE Advanced) networks. Some embodiments relate to Fifth Generation (5G) networks. Some embodiments relate to New Radio (NR) networks. Some embodiments relate to interleaving. Some embodiments relate to multiple-input multiple-output (MIIMO) techniques.

BACKGROUND

Base stations and mobile devices operating in a cellular network may exchange data. Various techniques may be used to improve capacity and/or performance, in some cases, including communication in accordance with new radio (NR) techniques. In an example, multiple-input multiple-output (MIIMO) techniques may be used. In some cases, usage of MIMO techniques may not be sufficient to meet performance targets, and additional techniques to improve performance may be used. Accordingly, there is a general need for methods and systems to improve performance in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
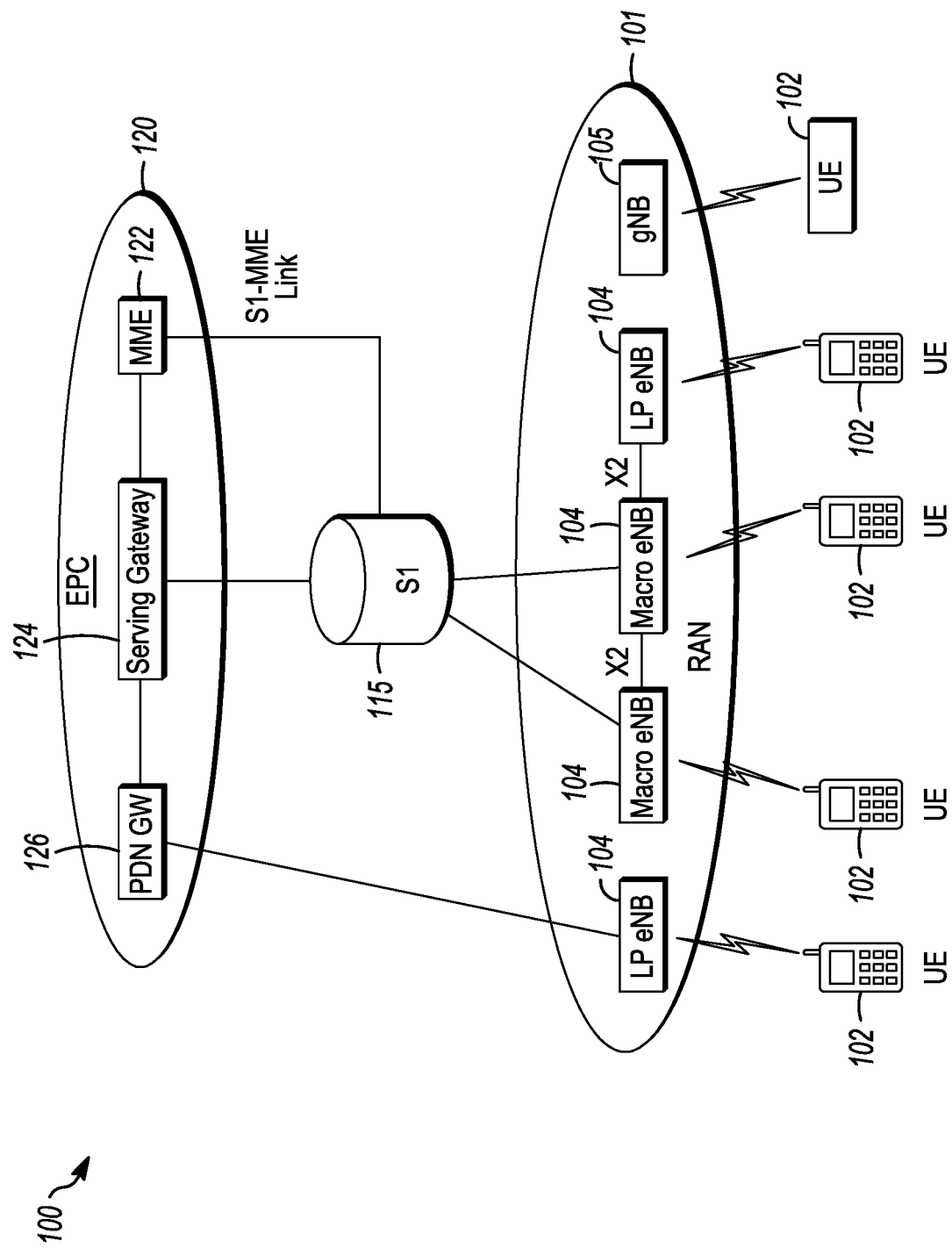
FIG. 1 is a functional diagram of an example network in accordance with some embodiments.

FIG. 1 is a functional diagram of an example network in accordance with some embodiments. In some embodiments, the network 100 may be a Third Generation Partnership Project (3GPP) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1. Some embodiments may not necessarily include all components shown in FIG. 1, and some embodiments may include additional components not shown in FIG. 1.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW)

124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Generation Node-B's (gNBs) 105. In some embodiments, one or more eNBs 104 may be configured to operate as gNBs 105. Embodiments are not limited to the number of eNBs 104 shown in FIG. 1 or to the number of gNBs 105 shown in FIG. 1. In some embodiments, the network 100 may not necessarily include eNBs 104. Embodiments are also not limited to the connectivity of components shown in FIG. 1.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102, gNBs 105 and/or eNBs 104 may be configured to operate in accordance with an NR protocol and/or NR techniques. References to a UE 102, eNB 104 and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface.

Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
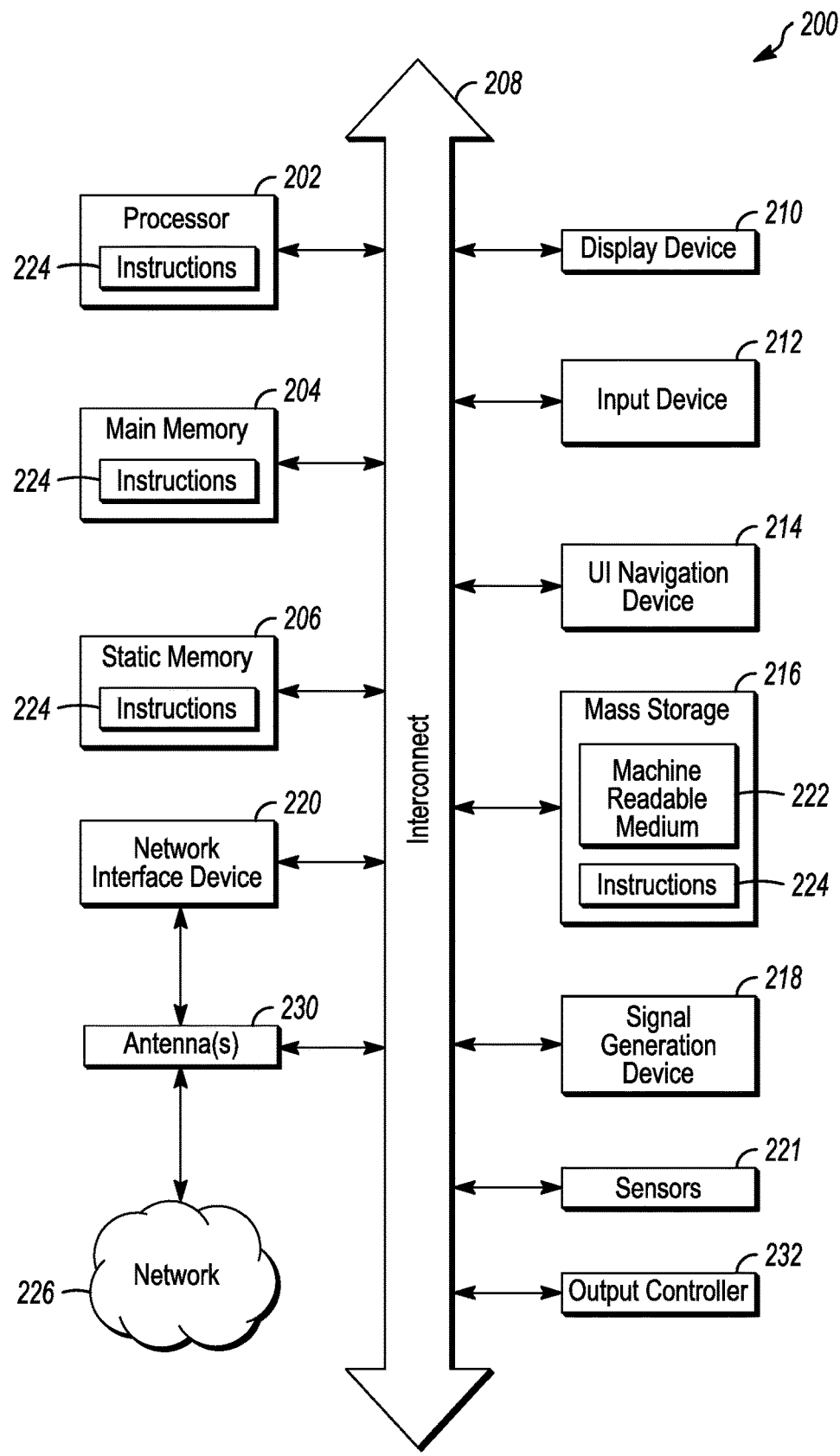
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
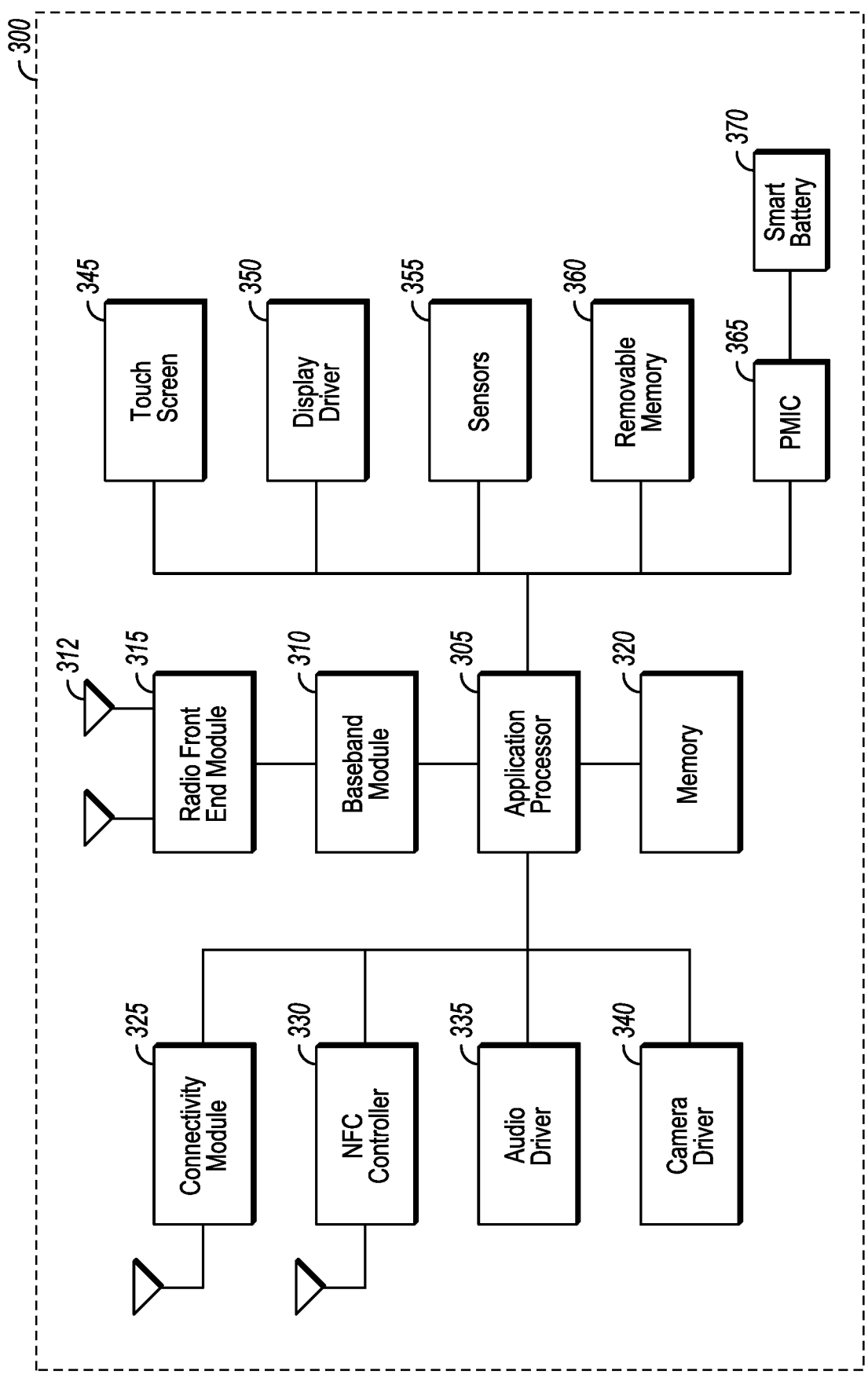
FIG. 3 illustrates a user device in accordance with some embodiments.

FIG. 3 illustrates a user device in accordance with some embodiments. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit ($I^2C$) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
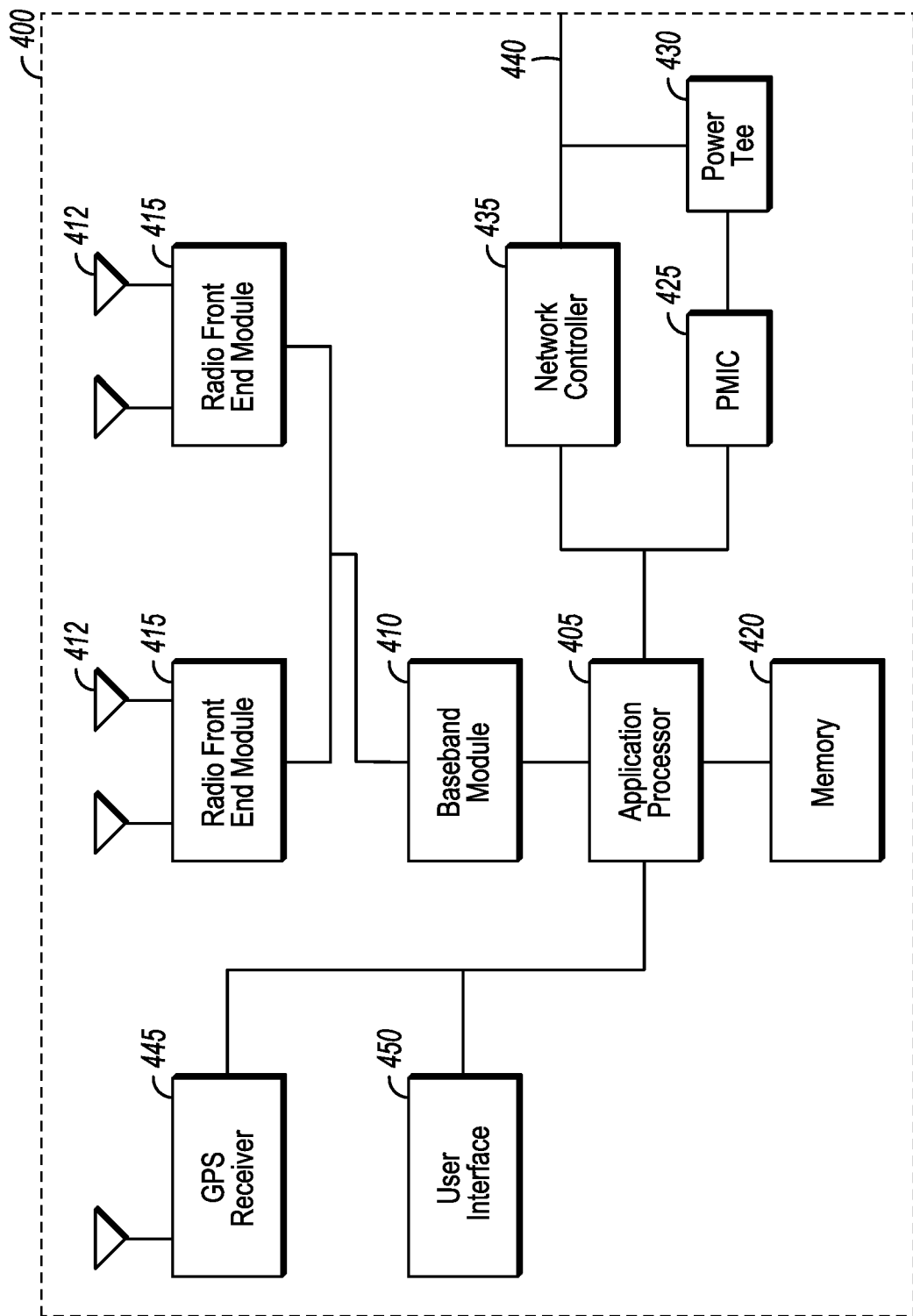
FIG. 4 illustrates a base station in accordance with some embodiments.

FIG. 4 illustrates a base station in accordance with some embodiments. In some embodiments, the base station 400 may be or may be configured to operate as an Evolved Node-B (eNB). In some embodiments, the base station 400 may be or may be configured to operate as a Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with an aspect. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose TO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM) and/or a three-dimensional crosspoint memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
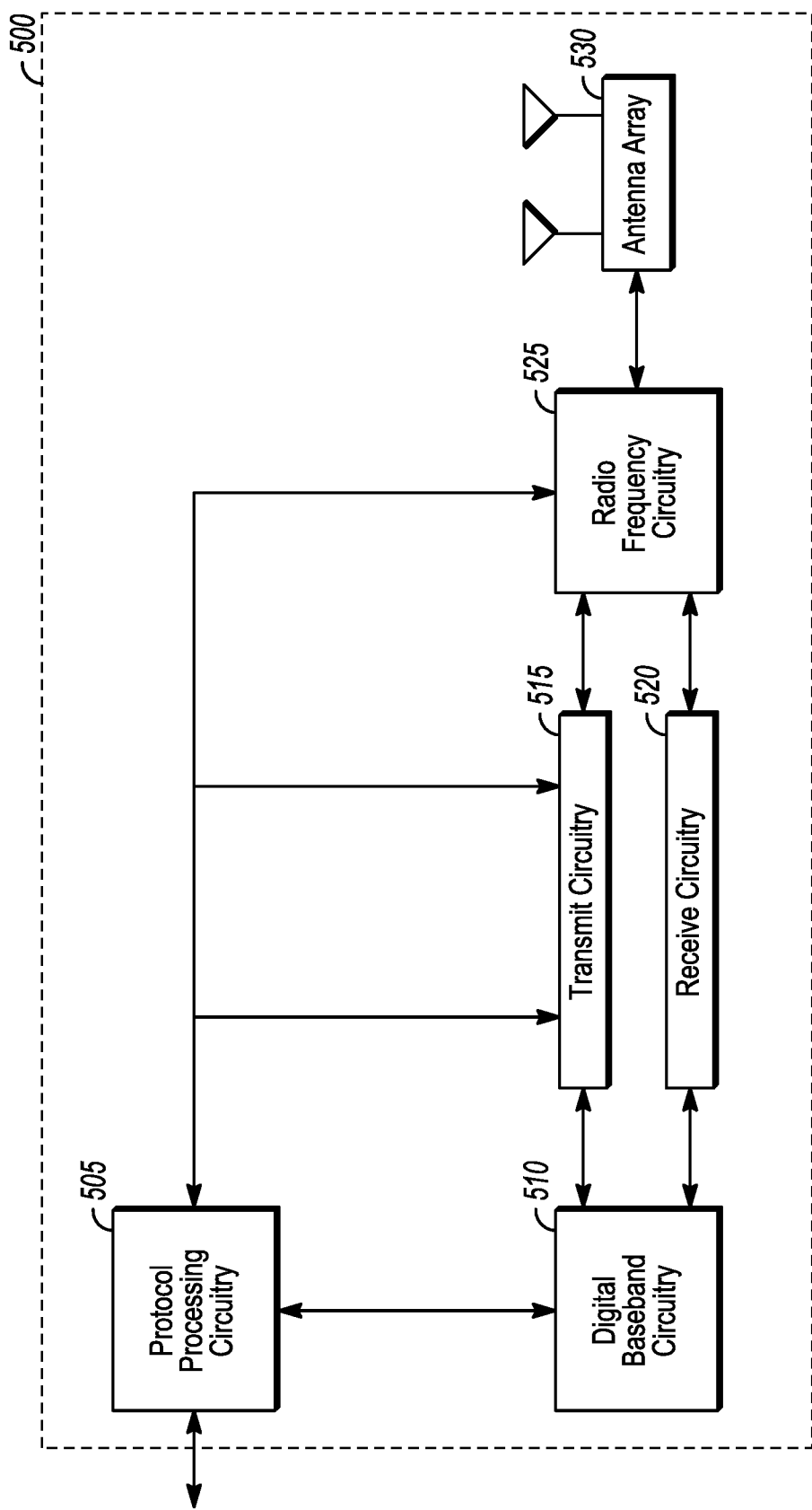
FIG. 5 illustrates an exemplary communication circuitry in accordance with some embodiments.

FIG. 5 illustrates an exemplary communication circuitry in accordance with some embodiments. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, an eNB 104, a gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the invention, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the UE 102, eNB 104, gNB 105, machine 200, user device 300 and/or base station 400 may include various components shown in FIGS. 2-5. Accordingly, techniques and operations described herein that refer to the UE 102 may be applicable to an apparatus for a UE. In some embodiments, techniques and operations described herein that refer to the gNB 105 may be applicable to an apparatus for an eNB. In some embodiments, techniques and operations described herein that refer to the gNB 105 may be applicable to an apparatus for a gNB.

Figure 6:
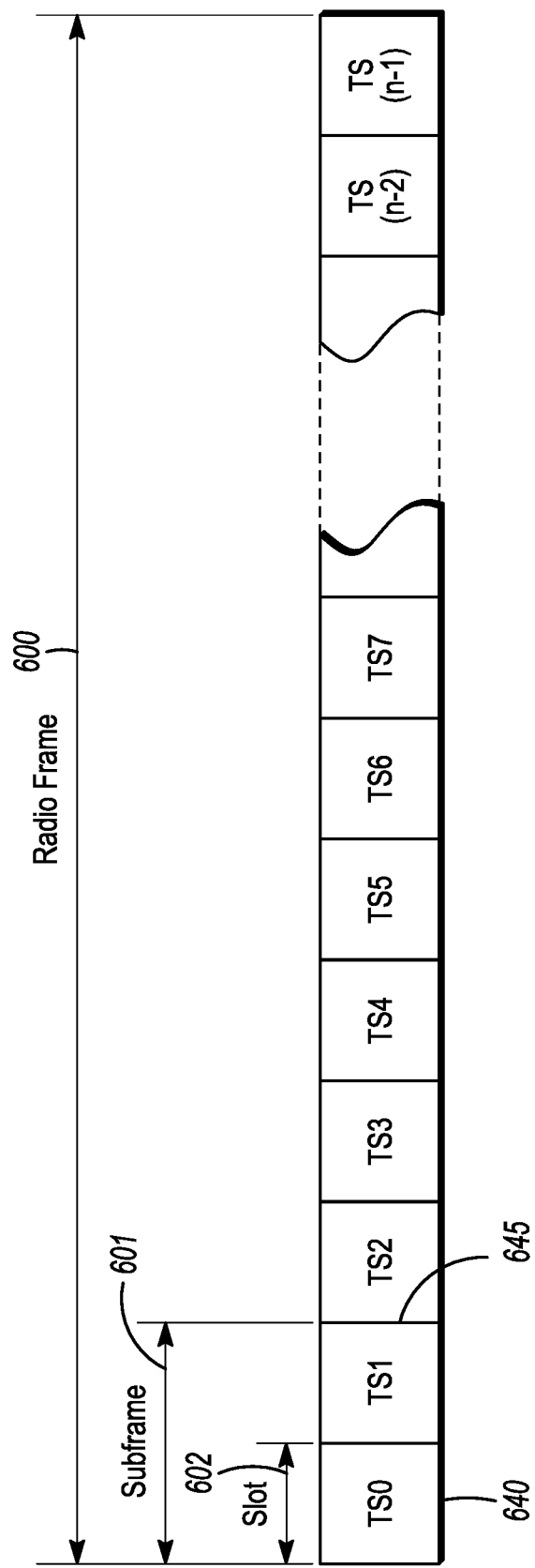
FIG. 6 illustrates an example radio frame structure in accordance with some embodiments.
Figure 7A:
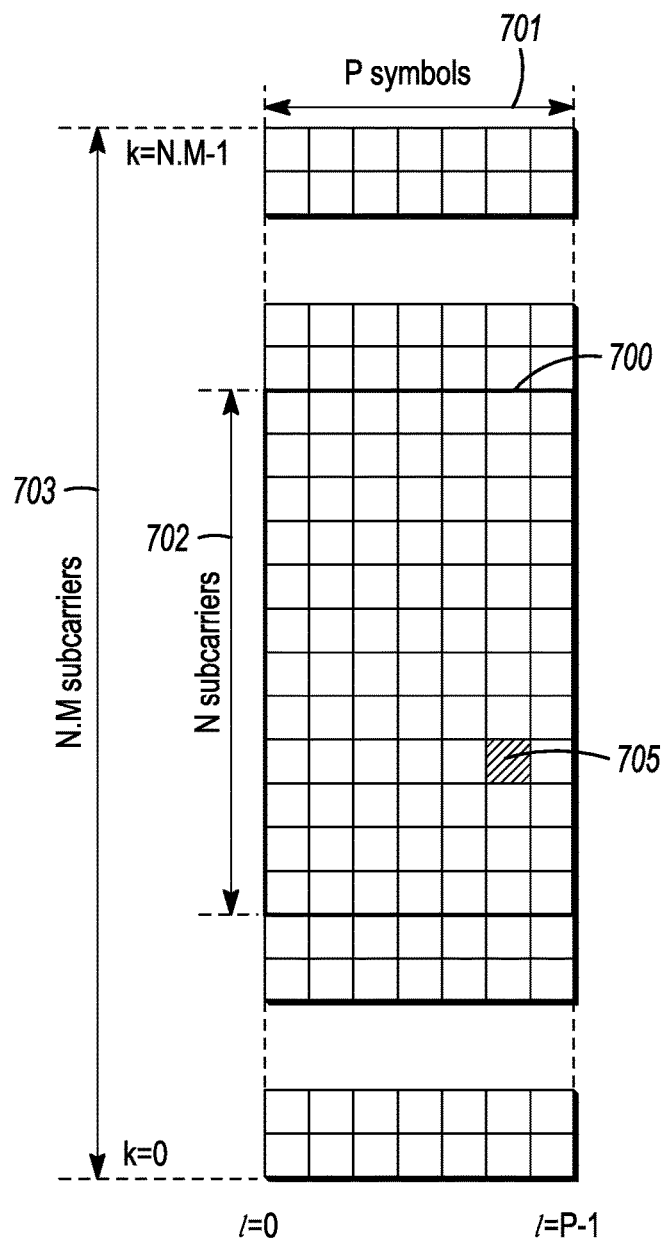
FIG. 7A and FIG. 7B illustrate example frequency resources in accordance with some embodiments.
Figure 7B:
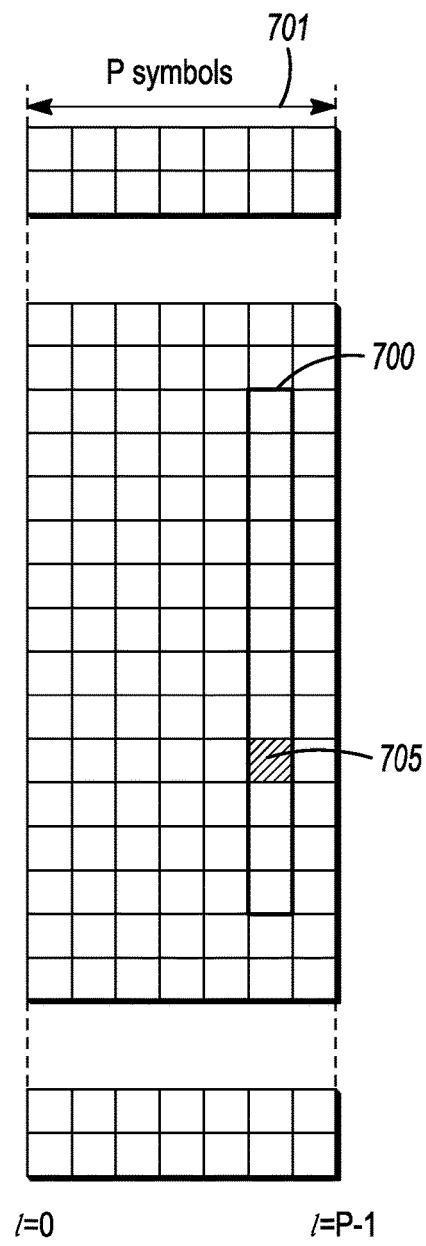
Figure 8A:
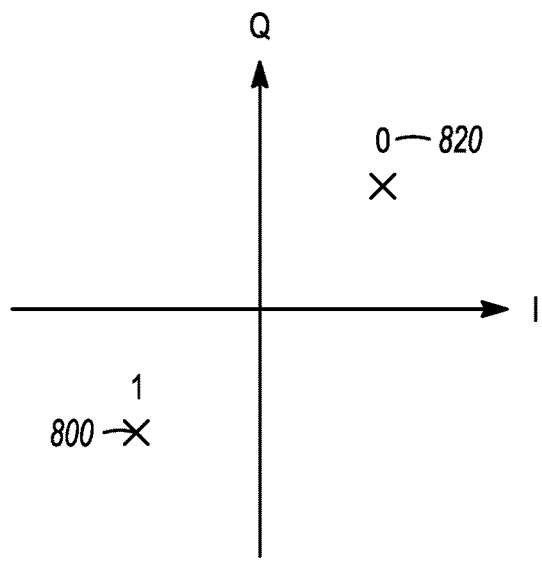
FIG. 8A, FIG. 8B and FIG. 8C illustrate examples of constellations that may be transmitted or received in accordance with some embodiments.
Figure 8B:
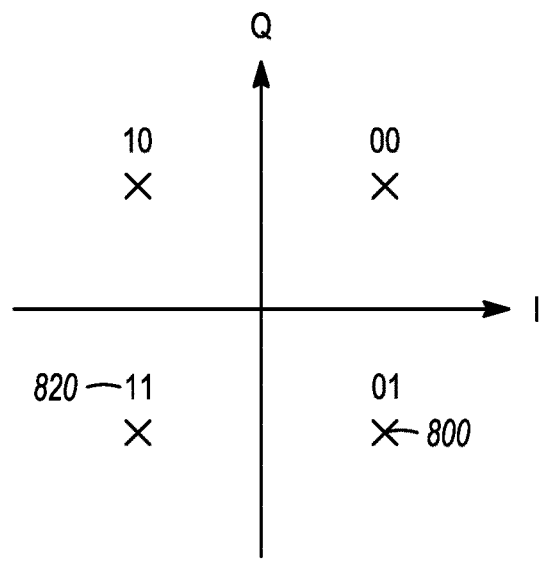
Figure 8C:
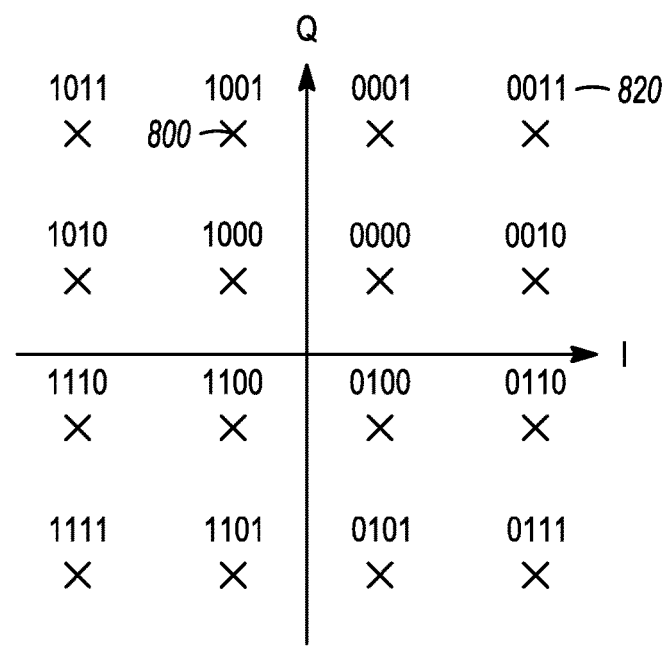

FIG. 6 illustrates an example of a radio frame structure in accordance with some embodiments. FIG. 7A and FIG. 7B illustrate example frequency resources in accordance with some embodiments. FIG. 8A, FIG. 8B and FIG. 8C illustrate examples of constellations that may be transmitted or received in accordance with some embodiments. It should be noted that the examples shown in those figures may illustrate some or all of the concepts and techniques described herein in some cases, but embodiments are not limited by the examples. For instance, embodiments are not limited by the name, number, type, size, ordering, arrangement and/or other aspects of the time resources, symbol periods, frequency resources, PRBs and other elements as shown in those figures. Although some of the elements shown in the examples of those figures may be included in a 3GPP LTE standard, 5G standard, NR standard and/or other standard, embodiments are not limited to usage of such elements that are included in standards.

An example of a radio frame structure that may be used in some aspects is shown in FIG. 6. In this example, radio frame 600 has a duration of ms. Radio frame 600 is divided into slots 602 each of duration 0.5 ms, and numbered from 0 to 19. Additionally, each pair of adjacent slots 602 numbered 2i and 2i+1, where i is an integer, is referred to as a subframe 601.

In some aspects using the radio frame format of FIG. 6, each subframe 601 may include a combination of one or more of downlink control information, downlink data information, uplink control information and uplink data information. The combination of information types and direction may be selected independently for each subframe 602.

In some aspects, a sub-component of a transmitted signal consisting of one subcarrier in the frequency domain and one symbol interval in the time domain may be termed a resource element. Resource elements may be depicted in a grid form as shown in FIG. 7A and FIG. 7B.

In some aspects, illustrated in FIG. 7A, resource elements may be grouped into rectangular resource blocks 700 consisting of 12 subcarriers in the frequency domain and the P symbols in the time domain, where P may correspond to the number of symbols contained in one slot, and may be 6, 7, or any other suitable number of symbols.

In some alternative aspects, illustrated in FIG. 7B, resource elements may be grouped into resource blocks 700 consisting of 12 subcarriers (as indicated by 702) in the frequency domain and one symbol in the time domain. In the depictions of FIG. 7A and FIG. 7B, each resource element 705 may be indexed as (k, l) where k is the index number of subcarrier, in the range 0 to N·M−1 (as indicated by 703), where N is the number of subcarriers in a resource block, and M is the number of resource blocks spanning a component carrier in the frequency domain.

FIGS. 8A, 8B and 8C illustrate examples of constellations that may be transmitted or received in accordance with some embodiments. Constellation points are shown on orthogonal in-phase and quadrature axes, representing, respectively, amplitudes of sinusoids at the carrier frequency and separated in phase from one another by 90 degrees.

FIG. 8A represents a constellation containing 2 points 800, known as binary phase shift keying (BPSK). FIG. 8B represents a constellation containing 4 points 800, known as quadrature phase shift keying (QPSK). FIG. 8C represents a constellation containing 16 points 800, known as quadrature amplitude modulation (QAM) with 16 points (16QAM or QAM16). Higher order modulation constellations, containing for example 64, 256 or 1024 points may be similarly constructed.

In the constellations depicted in FIGS. 8A, 8B and 8C, binary codes 820 are assigned to the points 800 of the constellation using a scheme such that nearest-neighbor points 800, that is, pairs of points 800 separated from each other by the minimum Euclidian distance, have an assigned binary code 820 differing by one binary digit. For example, in FIG. 8C the point assigned code 1000 has nearest neighbor points assigned codes 1001, 0000, 1100 and 1010, each of which differs from 1000 by one bit.

In accordance with some embodiments, the gNB 105 may map data symbols to resource elements (REs) of virtual resource blocks (VRBs). The gNB 105 may interleave the data symbols, on a per-VRB basis, to spatial layers of a multi-layer multiple-input multiple-output (MIMO) transmission. The data symbols may be interleaved based on different interleave patterns of VRB indexes for the spatial layers. The gNB 105 may map the interleaved data symbols of the spatial layers to REs of physical resource blocks (PRBs) for orthogonal frequency division multiplexing (OFDM) transmission. These embodiments are described in more detail below.

Figure 9:
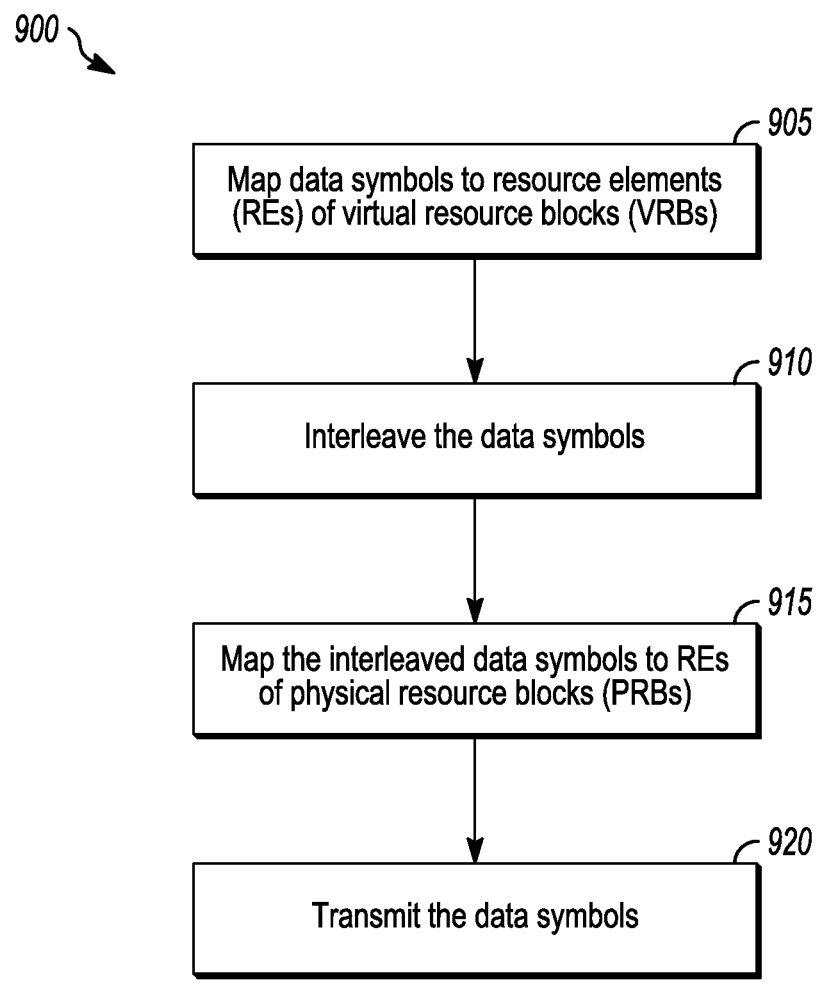
FIG. 9 illustrates the operation of a method of communication in accordance with some embodiments.

FIG. 9 illustrates the operation of a method of communication in accordance with some embodiments. It is important to note that embodiments of the method 900 may include additional or even fewer operations or processes in comparison to what is illustrated in FIG. 9. In addition, embodiments of the method 900 are not necessarily limited to the chronological order that is shown in FIG. 9. In describing the method 900, reference may be made to one or more of the figures described herein, although it is understood that the method 800 may be practiced with any other suitable systems, interfaces and components.

In some embodiments, a gNB 105 may perform one or more operations of the method 900, but embodiments are not limited to performance of the method 900 and/or operations of it by the gNB 105. In some embodiments, the UE 102 may perform one or more operations of the method 900. In some embodiments, the UE 102 may perform one or more operations that are similar to and/or reciprocal to one or more operations of the method 900. Accordingly, although references may be made to performance of one or more operations of the method 800 by the gNB 105 in descriptions herein, it is understood that the UE 102 may perform one or more of the same operation(s), similar operation(s) and/or reciprocal operation(s), in some embodiments.

In some embodiments, the eNB 104 may perform one or more operations of the method 900. In some embodiments, the eNB 104 may perform one or more operations that are similar to and/or reciprocal to one or more operations of the method 900. Accordingly, although references may be made to performance of one or more operations of the method 800 by the gNB 105 in descriptions herein, it is understood that the eNB 104 may perform one or more of the same operation(s), similar operation(s) and/or reciprocal operation(s), in some embodiments.

In addition, while the method 900 and other methods described herein may refer to eNBs 104, gNBs 105 or UEs 102 operating in accordance with 3GPP standards, 5G standards and/or other standards, embodiments of those methods are not limited to just those eNBs 104, gNBs 105 or UEs 102 and may also be practiced on other devices, such as a Wi-Fi access point (AP) or user station (STA). In addition, the method 900 and other methods described herein may be practiced by wireless devices configured to operate in other suitable types of wireless communication systems, including systems configured to operate according to various IEEE standards such as IEEE 802.11. The method 900 may also be applicable to an apparatus of a UE 102, an apparatus of an eNB 104, an apparatus of a gNB 105 and/or an apparatus of another device described above.

It should also be noted that embodiments are not limited by references herein (such as in descriptions of the methods 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

At operation 905, the gNB 105 may map data symbols to resource elements (REs) of virtual resource blocks (VRBs). In some embodiments, the data symbols may be based on data bits, although the scope of embodiments is not limited in this respect. For instance, one or more operations may be applied to the data bits, including but not limited to forward error correction (FEC), bit-to-symbol mapping and/or other(s).

In some embodiments, the data symbols may include multiple codeblocks, although the scope of embodiments is not limited in this respect.

In some embodiments, VRBs may include predetermined pluralities of REs. At least some of the VRBs may include non-contiguous REs. In some embodiments, physical resource blocks (PRBs) may include predetermined pluralities of contiguous REs.

At operation 910, the gNB 105 may interleave the data symbols. It should be noted that in some embodiments, operation 905 may not necessarily be performed. For instance, the gNB 105 may interleave the data symbols without usage of VRBs, in some embodiments. At operation 915, the gNB 105 may map the interleaved data symbols to REs of physical resource blocks (PRBs).

In some embodiments, the gNB 105 may map the interleaved data symbols to the REs of PRBs in one OFDM symbol for the OFDM transmission. For instance, the gNB 105 may map the interleaved data symbols to the REs of PRBs in a single OFDM symbol for the OFDM transmission. The scope of embodiments is not limited to usage of one OFDM symbol, however, as the gNB 105 may map the interleaved data symbols to REs of PRBs in one or more OFDM symbols, in some embodiments.

In some embodiments, the gNB 105 may perform one or more operations (including but not limited to interleaving, mapping and/or other) on data symbols that include multiple codeblocks. One or more of the interleaving techniques and/or mapping techniques described herein may be used, although the scope of embodiments is not limited in this respect. The data symbols and/or interleaved data symbols may be mapped to one OFDM symbol for transmission, although the scope of embodiments is not limited in this respect.

It should be noted that explicit operations, such as 905-915, may not necessarily be performed in some embodiments. In a non-limiting example, one or more of those operations may be combined into one operation. In another non-limiting example, operations 905-915 may be performed by one operation. In another non-limiting example, operations 910-915 may be performed by one operation.

In another non-limiting example, techniques such as usage of pre-computed mappings and/or predetermined mappings may be used. For instance, a mapping between the data symbols and the PRBs may be used, and one or more of the operations 905-915 may not necessarily be performed explicitly. In some embodiments, the mapping may be pre-computed and/or predetermined based on functionality provided by one or more of operations 905-915.

In a non-limiting example, the gNB 105 may interleave the data symbols to first interleaved symbols based on a first interleave pattern of VRB indexes. The first interleave pattern may be for a first spatial layer of a multi-layer MIMO transmission. The gNB 105 may interleave the data symbols to second interleaved symbols based on a second interleave pattern of the VRB indexes. The second interleave pattern may be for a second spatial layer of the multi-layer MIMO transmission. In some embodiments, the first and second interleave patterns may be the same. In some embodiments, the first and second interleave patterns may be different.

Continuing the above example, the gNB 105 may map the first interleaved symbols to REs of PRBs for orthogonal frequency division multiplexing (OFDM) transmission in the first spatial layer. The gNB 105 may map the second interleaved symbols to the REs of the PRBs for OFDM transmission in the second spatial layer. In some embodiments, the gNB 105 may map the first interleaved symbols to the REs of the PRBs based on a predetermined mapping between interleaved VRB indexes and PRB indexes and may map the second interleaved symbols to the REs of the PRBs based on the predetermined mapping between interleaved VRB indexes and PRB indexes.

This example may be extended to more than two layers. For instance, the gNB 105 may interleave the data symbols based on one or more additional interleave patterns for one or more additional spatial layers of the multi-layer MIMO transmission. In a non-limiting example, at least one of the additional interleave patterns may be different from the first and second interleave patterns. In another non-limiting example, all of the interleaving patterns (first, second and/or others) may be different. In another non-limiting example, all of the interleaving patterns (first, second and/or others) may be the same. In another non-limiting example, two or more of the interleaving patterns (first, second and/or others) may be different.

In some embodiments, the gNB 105 may encode data symbols for OFDM transmission in a first spatial layer of a multi-layer MIMO transmission. The data symbols may be mapped to REs based on a first interleave pattern between data symbol indexes and RE indexes. The gNB 105 may encode the data symbols for OFDM transmission in a second spatial layer of the multi-layer MIMO transmission. The data symbols may be mapped to the REs based on a second interleave pattern between the data symbol indexes and the RE indexes. The first and second interleave patterns may be the same, in some cases. The first and second interleave patterns may be different, in some cases.

In addition, the techniques described herein for two spatial layers (first and second) may be extended to more than two spatial layers, in some embodiments. For instance, the gNB 105 may encode the data symbols for OFDM transmission in one or more additional spatial layers of the multi-layer MIMO transmission, wherein an interleave pattern between the data symbol indexes and the RE indexes for at least one of the additional spatial layers is different from the first and second interleave patterns. Examples below (and elsewhere herein) that refer to two layers may be extended to more than two layers, in some embodiments.

In a non-limiting example, the first and second interleave patterns may be based on a block interleave matrix configurable for inputs on a per-row basis and for outputs on a per-column basis. The first interleave pattern may be based on a first permutation of rows of the block interleave matrix. The second interleave pattern may be based on a second permutation of the rows of the block interleave matrix.

In another non-limiting example, the first and second interleave patterns may be based on a block interleave matrix configurable for inputs on a per-row basis and for outputs on a per-column basis. The first interleave pattern may be based on a first permutation of columns of the block interleave matrix. The second interleave pattern may be based on a second permutation of the columns of the block interleave matrix.

In another non-limiting example, the first and second interleave patterns may be based on a block interleave matrix configurable for inputs on a per-row basis and for outputs on a per-column basis. The first interleave pattern may be based on a first start column for the outputs. The second interleave pattern may be based on a second start column for the outputs In another non-limiting example, the first and second interleave patterns may be based on a block interleave matrix configurable for inputs on a per-row basis and for outputs on a per-column basis. If a number of the data symbols is not a multiple of a number of rows of the block interleave matrix and a number of columns of the block interleave matrix, the gNB 105 may divide the data symbols to include first data symbols of size equal to an integer number of rows for the block interleave matrix and second data symbols that includes one or more orphan data symbols. The gNB 105 may determine the outputs based on: the first data symbols written in a row-wise manner to a plurality of rows; the orphan data symbols written in a row wise manner to another row after the plurality of rows; and the first data symbols read from the plurality of rows in a column-wise manner appended by the orphan data symbols.

In another non-limiting example, the first and second interleave patterns may be based on a block interleave matrix configurable for inputs on a per-row basis and for outputs on a per-column basis. If a number of the data symbols is not a multiple of a number of rows of the block interleave matrix and a number of columns of the block interleave matrix, the gNB 105 may divide the data symbols to include a first data symbols of size equal to an integer number of rows for the block interleave matrix and second data symbols that includes one or more orphan data symbols. The gNB 105 may determine the outputs based on: the first data symbols written in a row-wise manner to a plurality of rows; the orphan data symbols written to one or more elements of another row after the plurality of rows; and the first data symbols and the orphan data symbols read from the plurality of rows in a column-wise manner.

In another non-limiting example, the first and second interleave patterns may be based on a block interleave matrix configurable for inputs on a per-row basis and for outputs on a per-column basis. The first interleave pattern may be based on a first read index for the outputs. The first read index may be equal to a row and/or column within the block interleave matrix. The second interleave pattern may be based on a second read index for the outputs. The second read index may be offset from the first read index by a predetermined amount.

In some embodiments, the gNB 105 may encode data symbols for OFDM transmission in multiple spatial layers of a multi-layer MIMO transmission. The data symbols may be mapped to REs of PRBs based on: a predetermined mapping between the data symbols and REs of a plurality of VRBs; interleave patterns of VRB indexes for the spatial layers, wherein the interleave patterns for at least two of the spatial layers may be different; and a predetermined mapping between interleaved VRB indexes and PRB indexes. In some embodiments, the VRBs may include predetermined pluralities of REs. At least some of the VRBs may include non-contiguous REs. The PRBs may include predetermined pluralities of contiguous REs At operation 920, the gNB 105 may transmit the data symbols. In some embodiments, a multi-layer MIMO transmission technique may be used. In some embodiments, orthogonal frequency division multiple access (OFDMA) techniques may be used. In some embodiments, orthogonal frequency division multiple access (OFDMA) techniques may be used. Embodiments are not limited to transmission in accordance with those techniques, however.

In some embodiments, an apparatus of a UE 102 may comprise memory. The memory may be configurable to store interleaved symbols. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to interleaving. The apparatus of the UE 102 may include a transceiver to transmit interleaved symbols. The transceiver may transmit and/or receive other blocks, messages and/or other elements.

Figure 10:
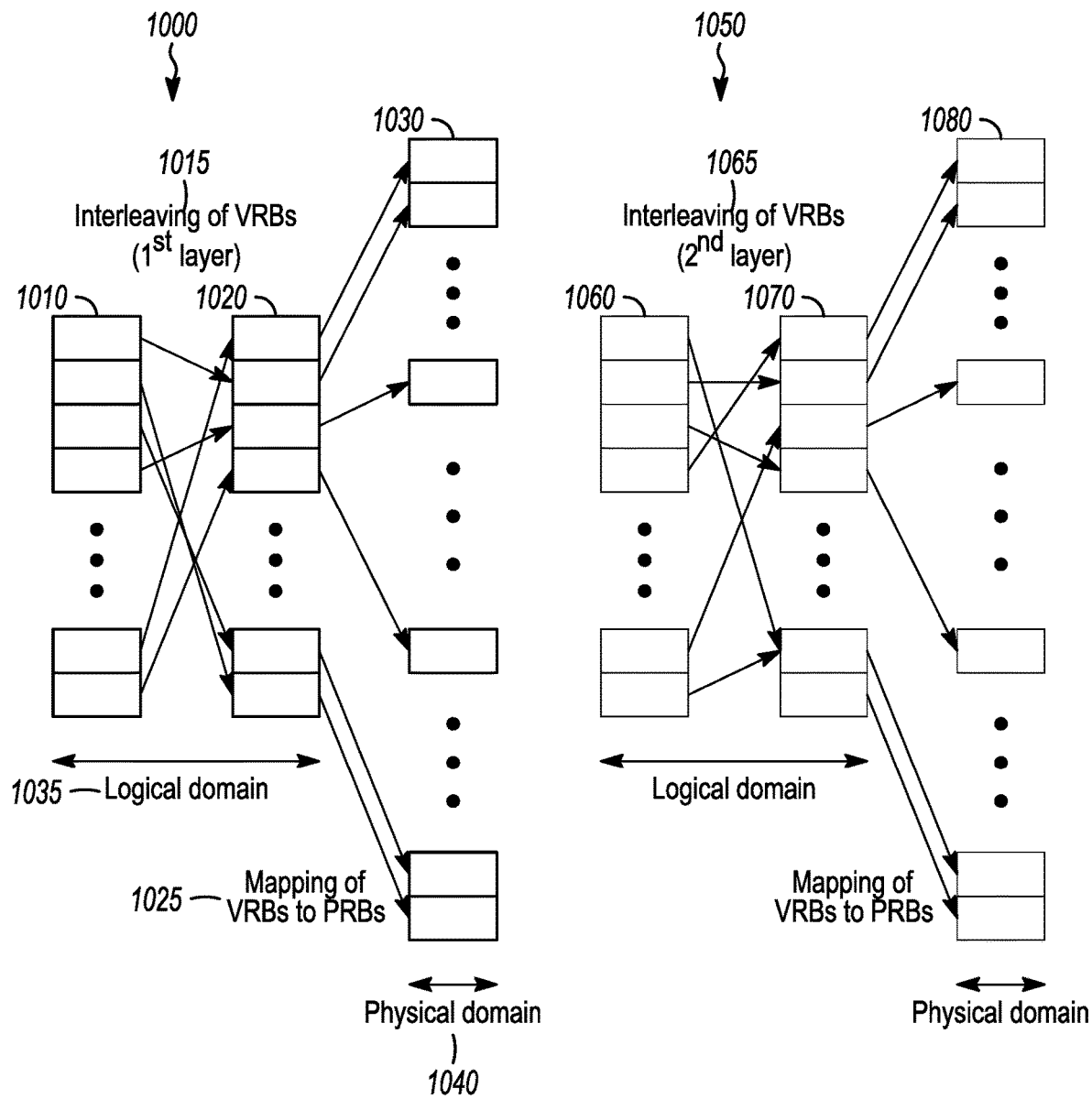
FIG. 10 illustrates an example of interleaving in accordance with some embodiments.
Figure 11:
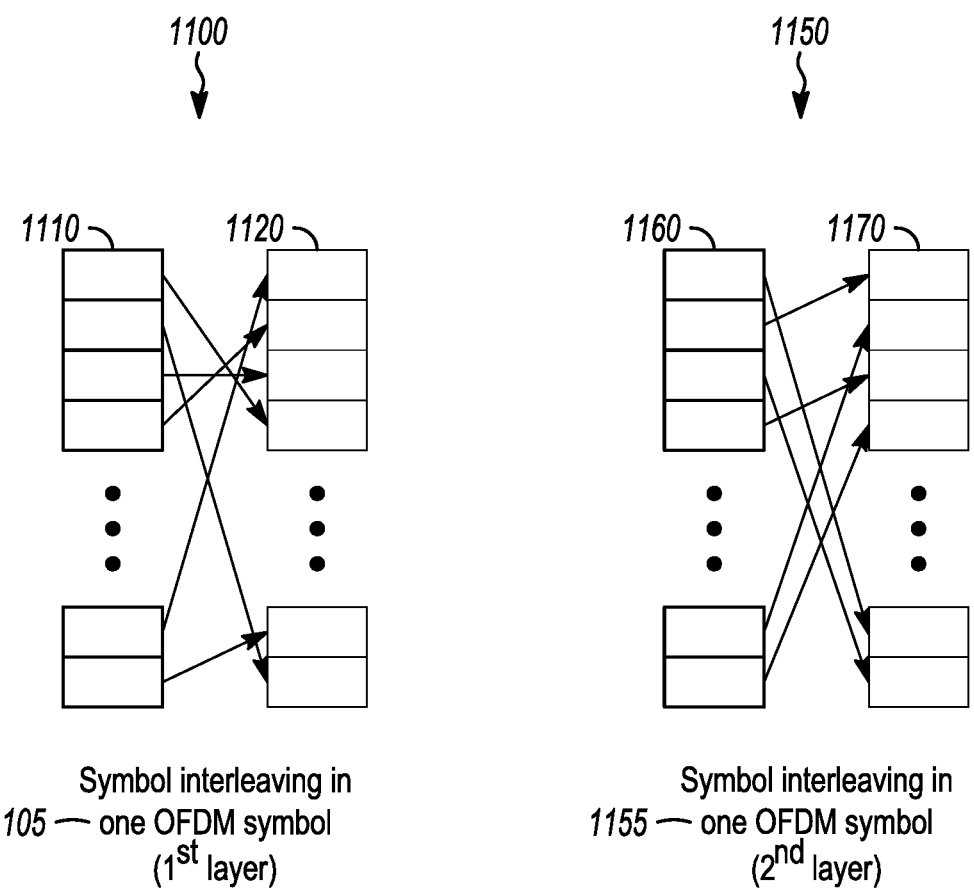
FIG. 11 illustrates another example of interleaving in accordance with some embodiments.
Figure 12:
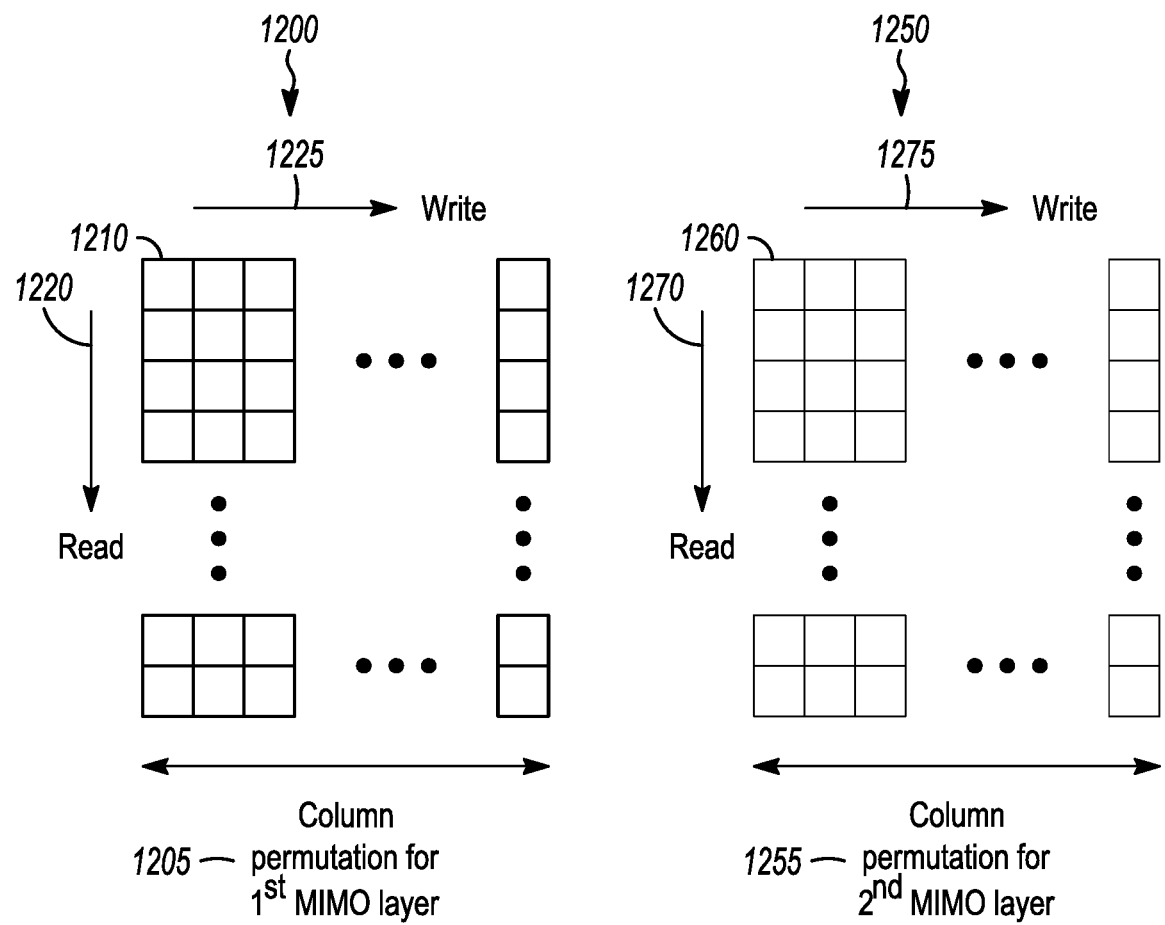
FIG. 12 illustrates another example of interleaving in accordance with some embodiments.
Figure 13:
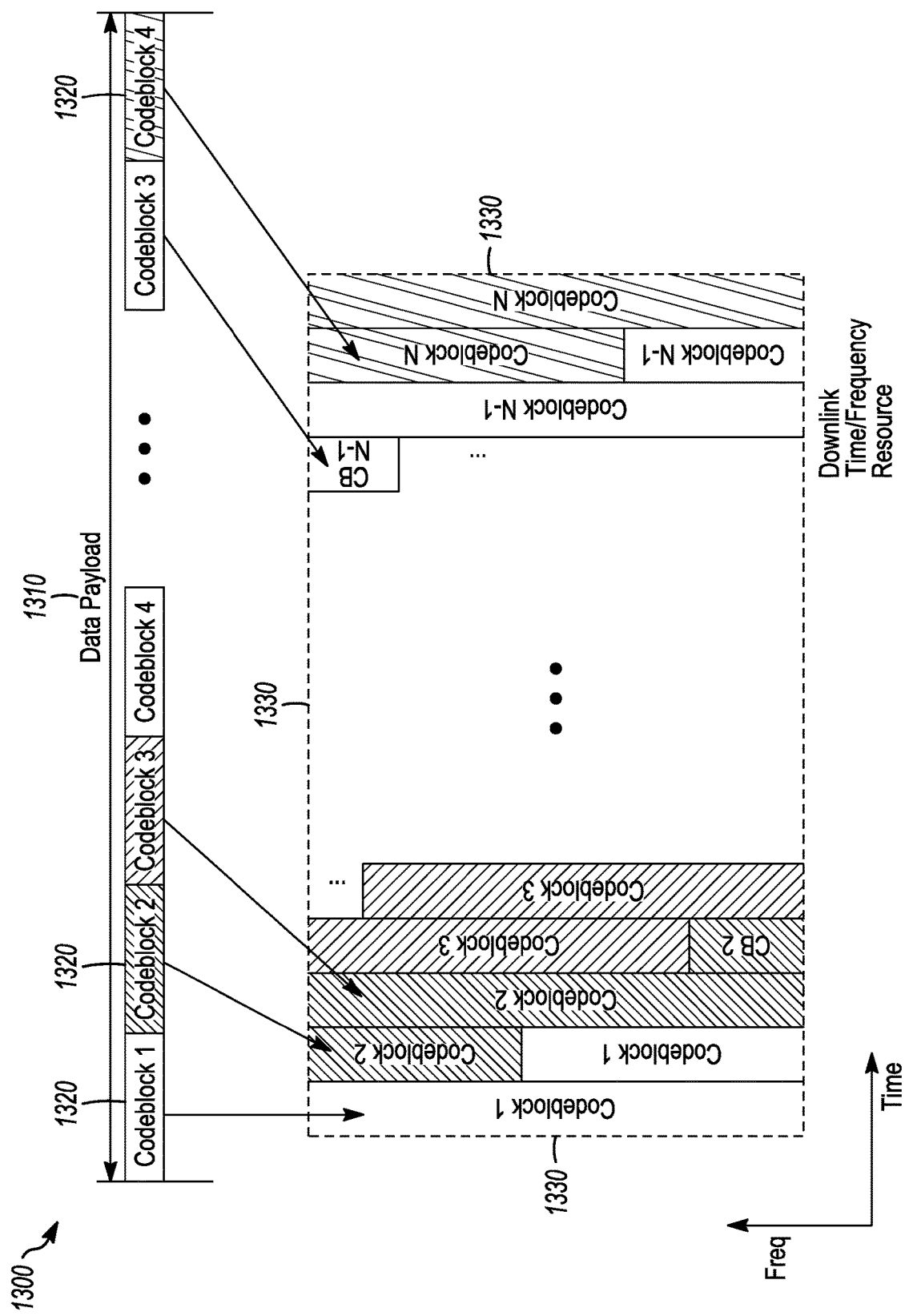
FIG. 13 illustrates example code-blocks in accordance with some embodiments.
Figure 14:
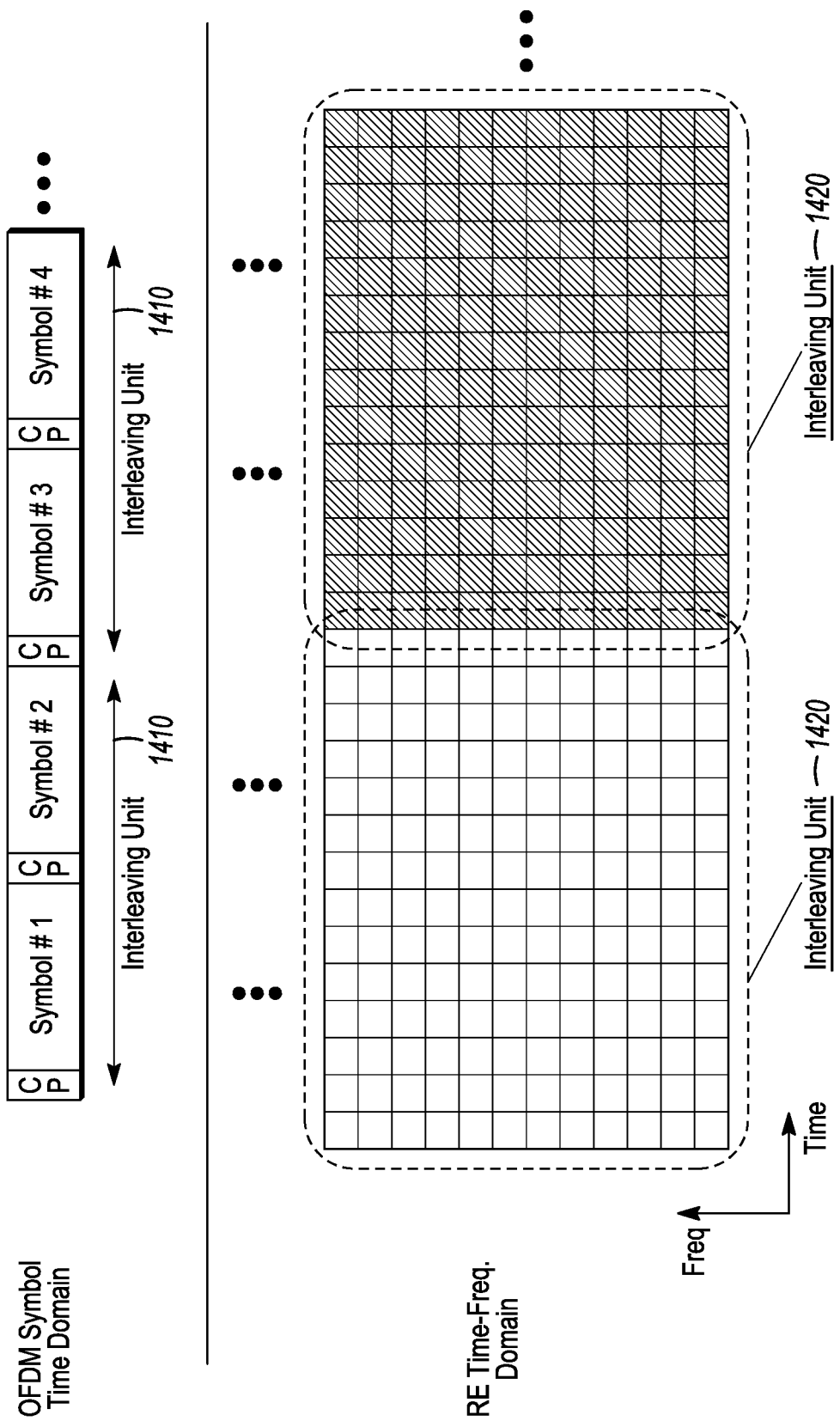
FIG. 14 illustrates example interleaving units in accordance with some embodiments.
Figure 15A:
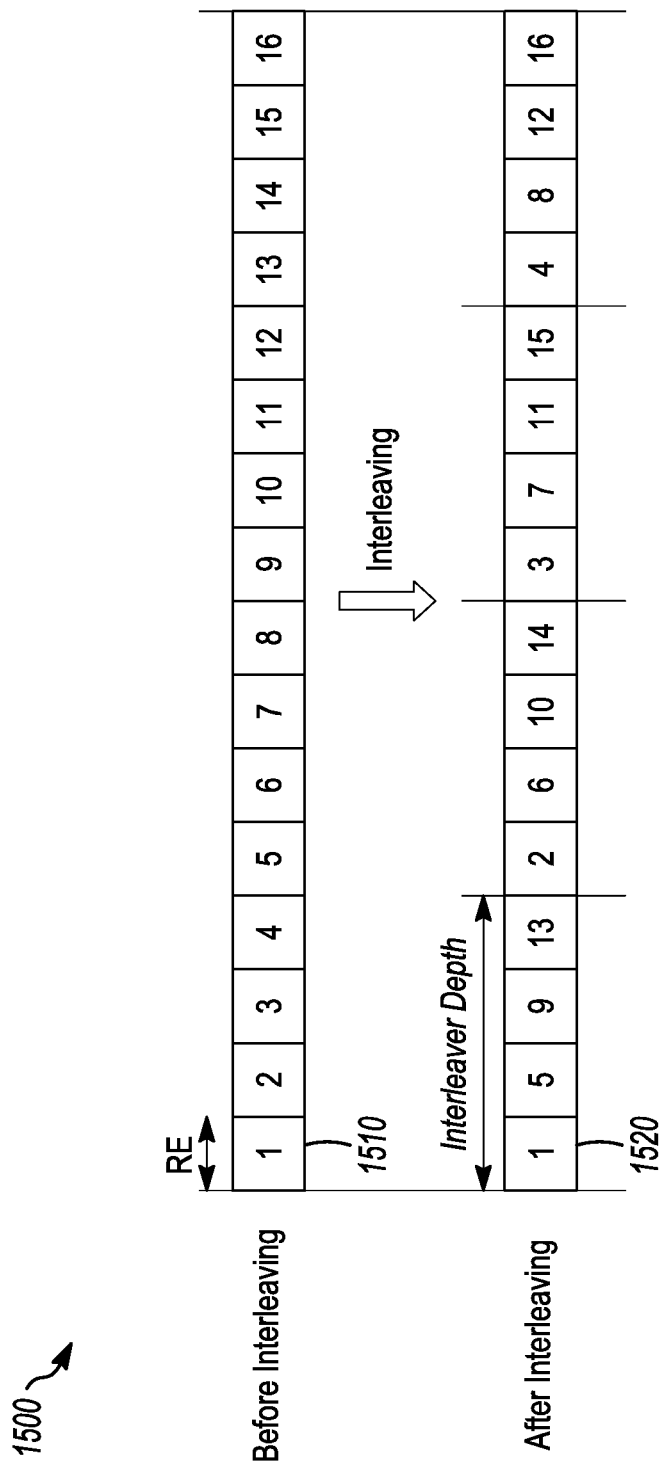
FIG. 15A and FIG. 15B illustrate additional examples of interleaving in accordance with some embodiments.
Figure 15B:
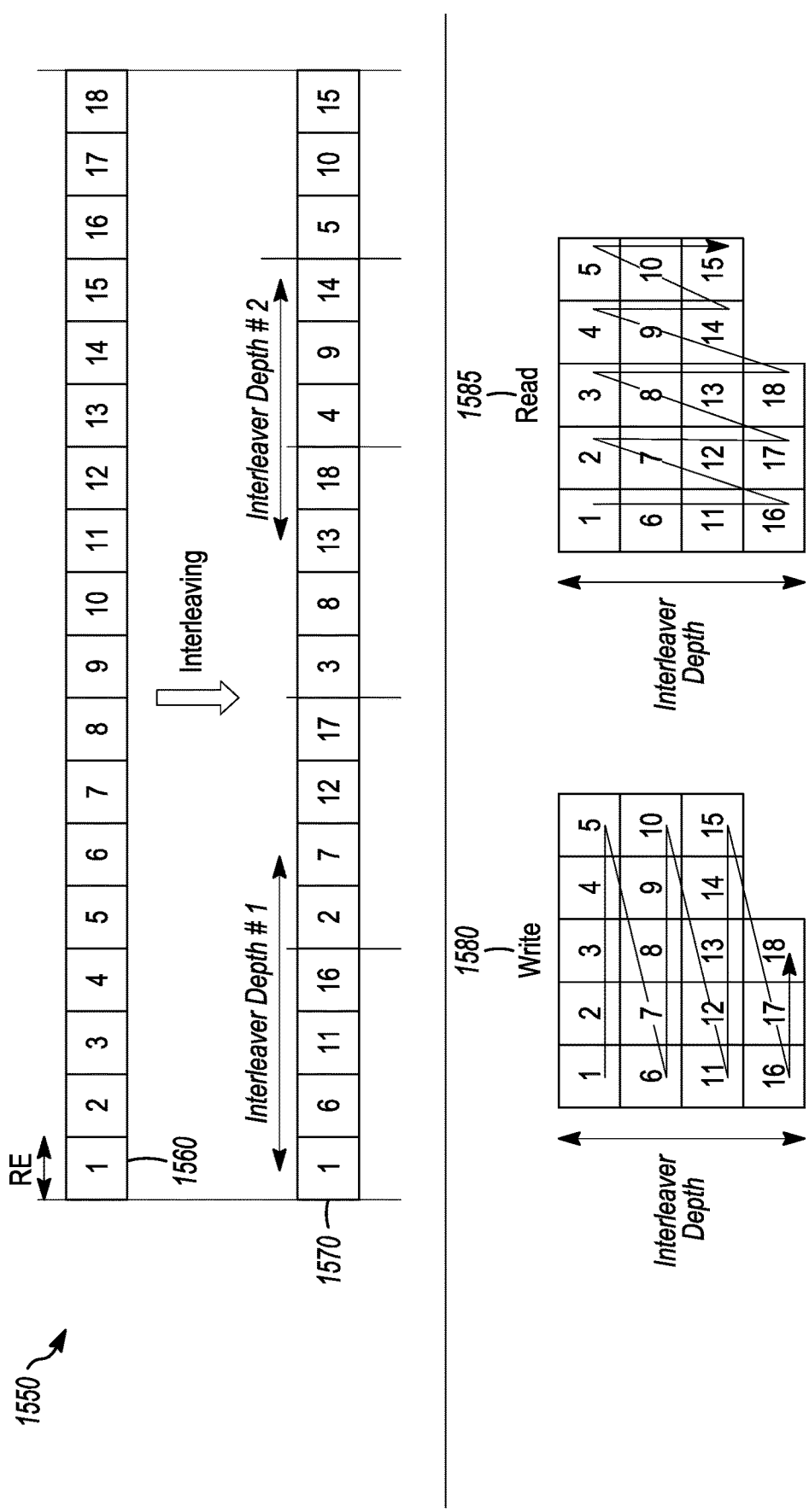
Figure 16A:
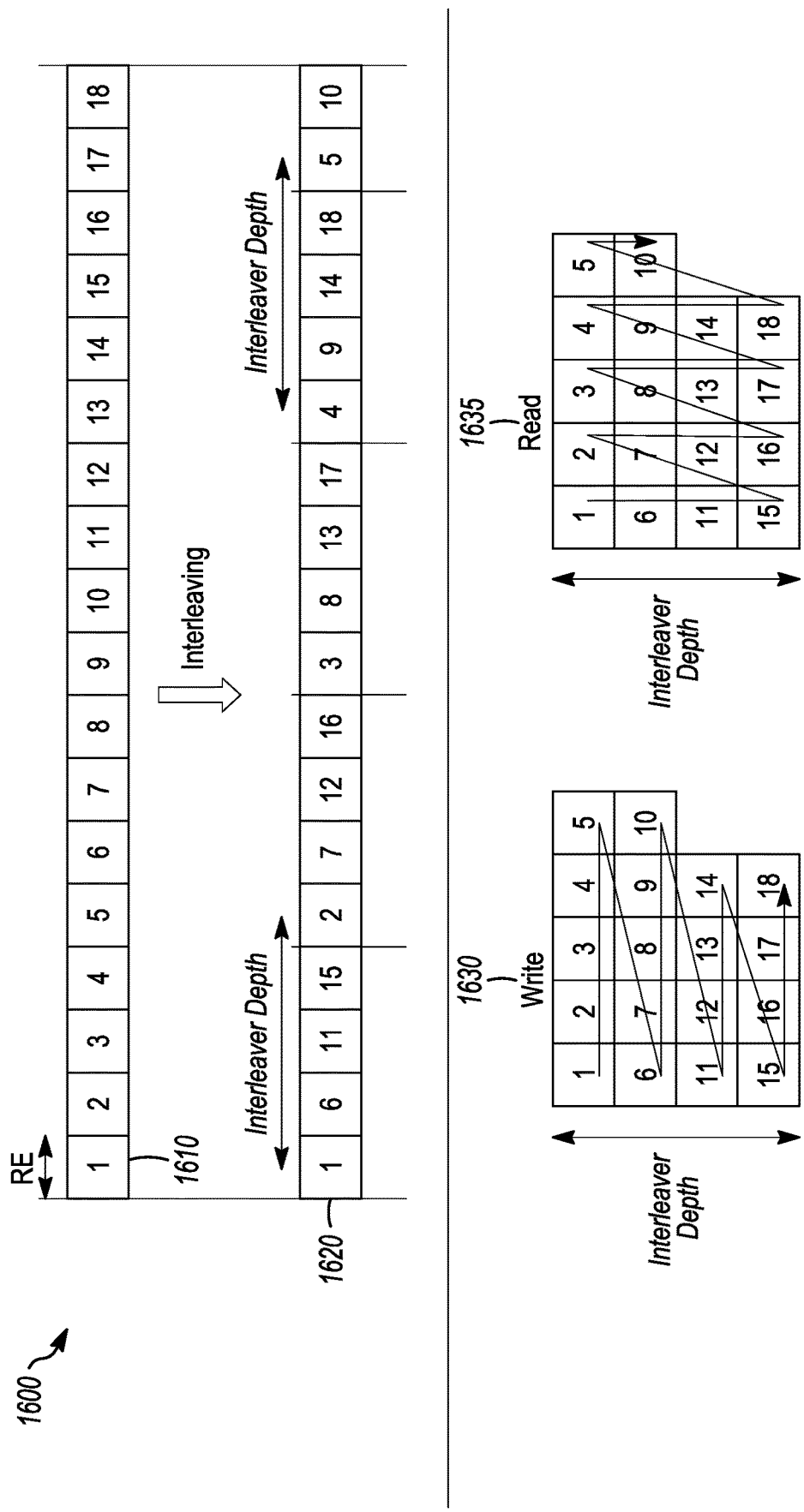
FIG. 16A and FIG. 16B illustrate additional examples of interleaving in accordance with some embodiments.
Figure 16B:
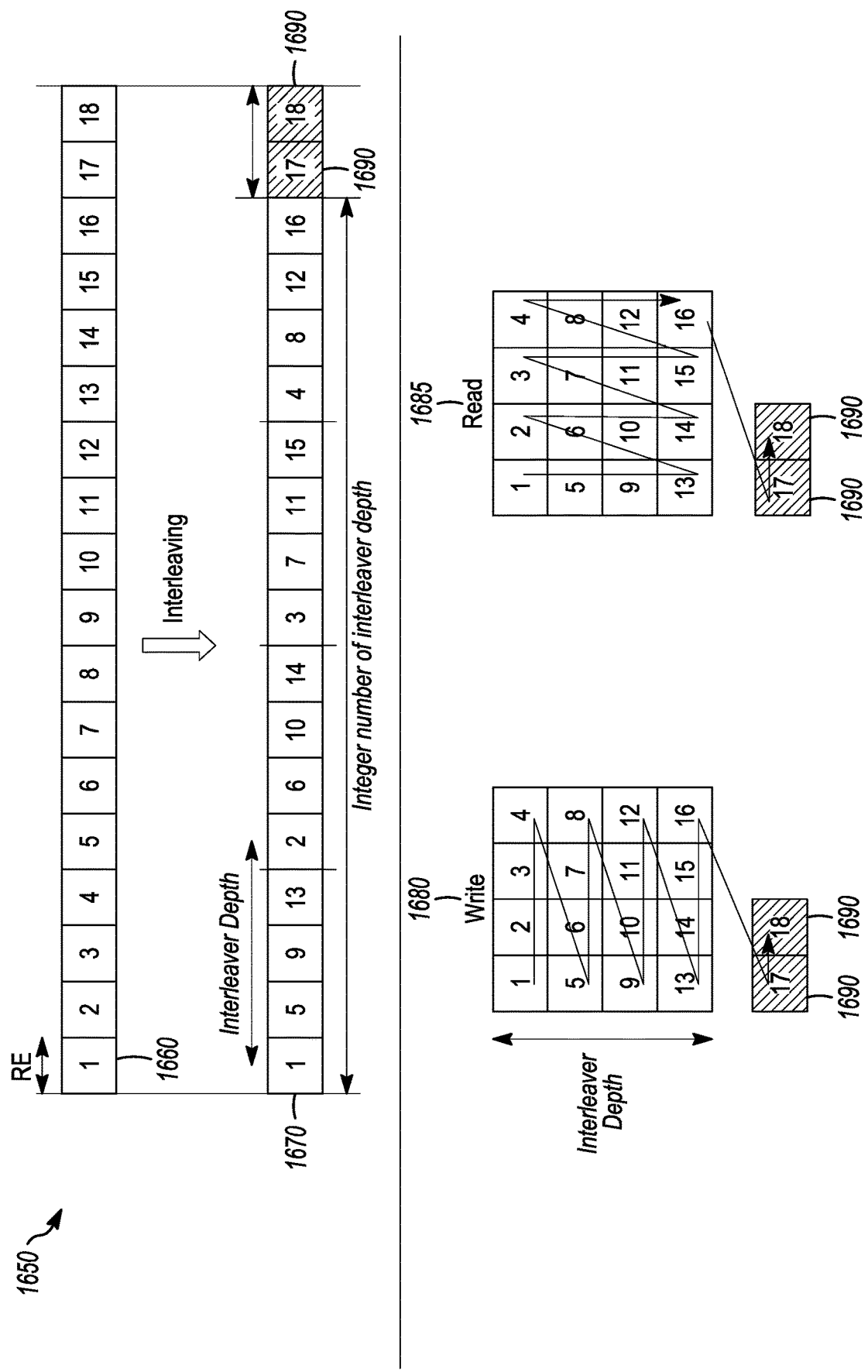
Figure 17A:
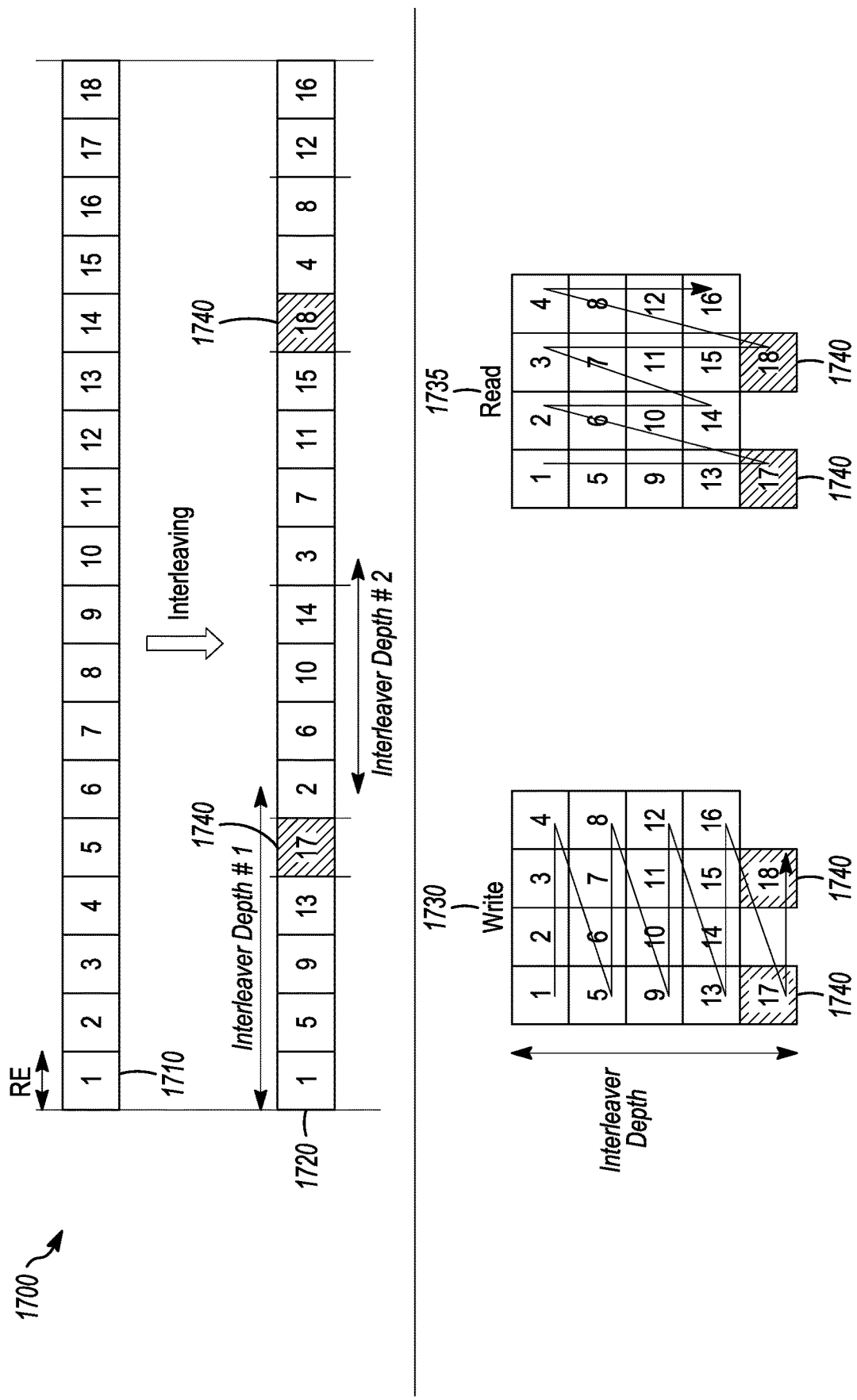
FIG. 17A and FIG. 17B illustrate additional examples of interleaving in accordance with some embodiments.
Figure 17B:
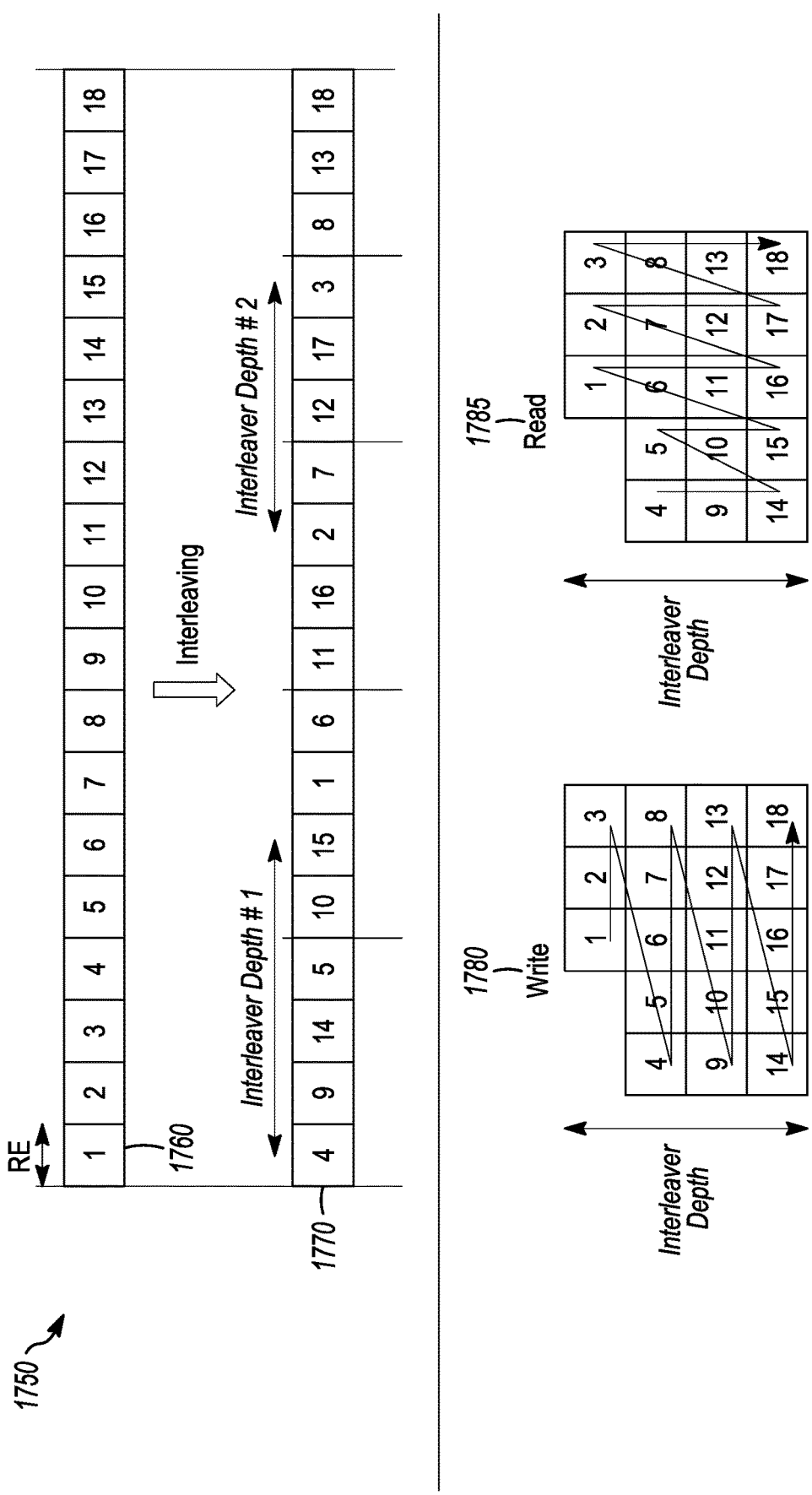
Figure 18A:
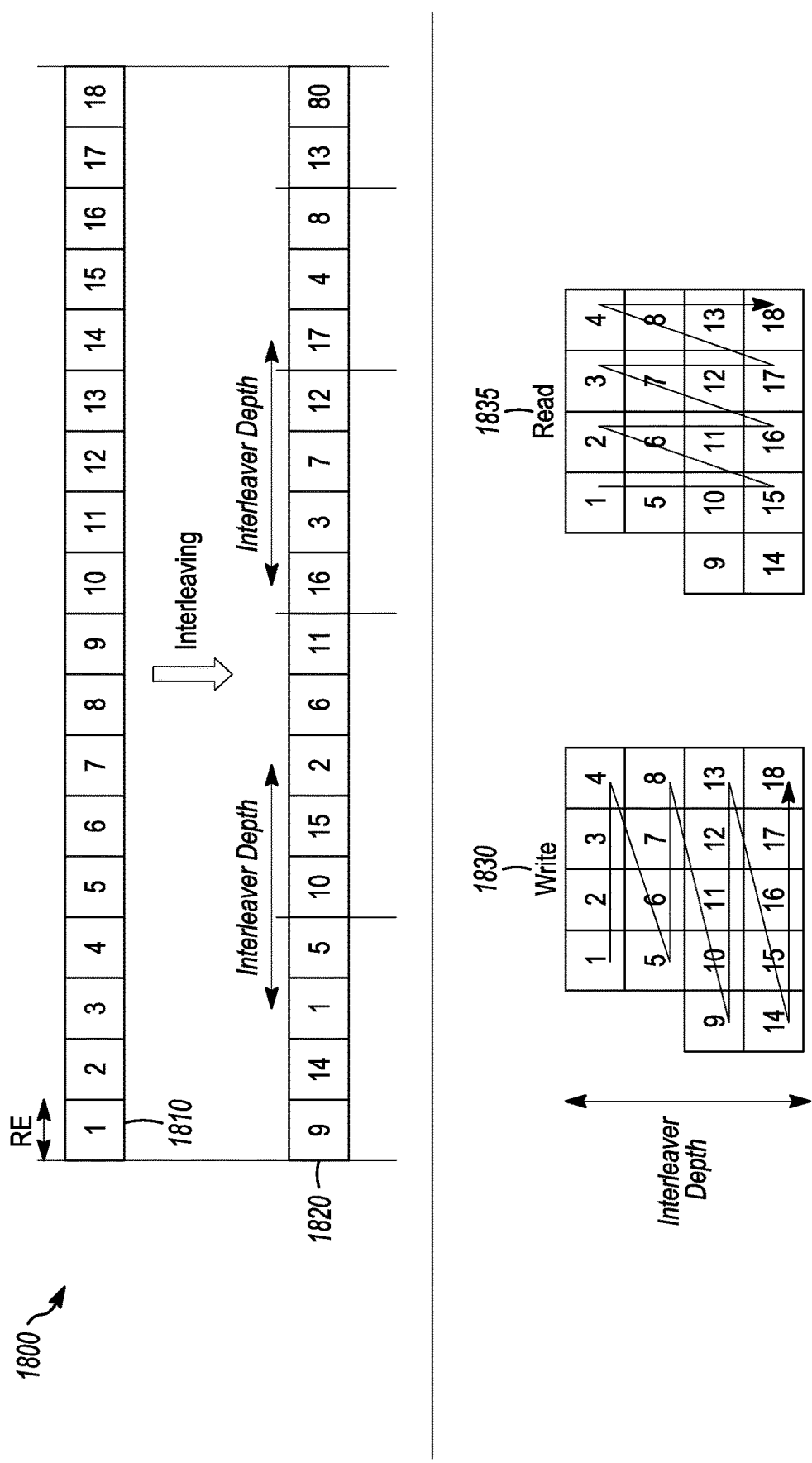
FIG. 18A and FIG. 18B illustrate additional examples of interleaving in accordance with some embodiments.
Figure 18B:
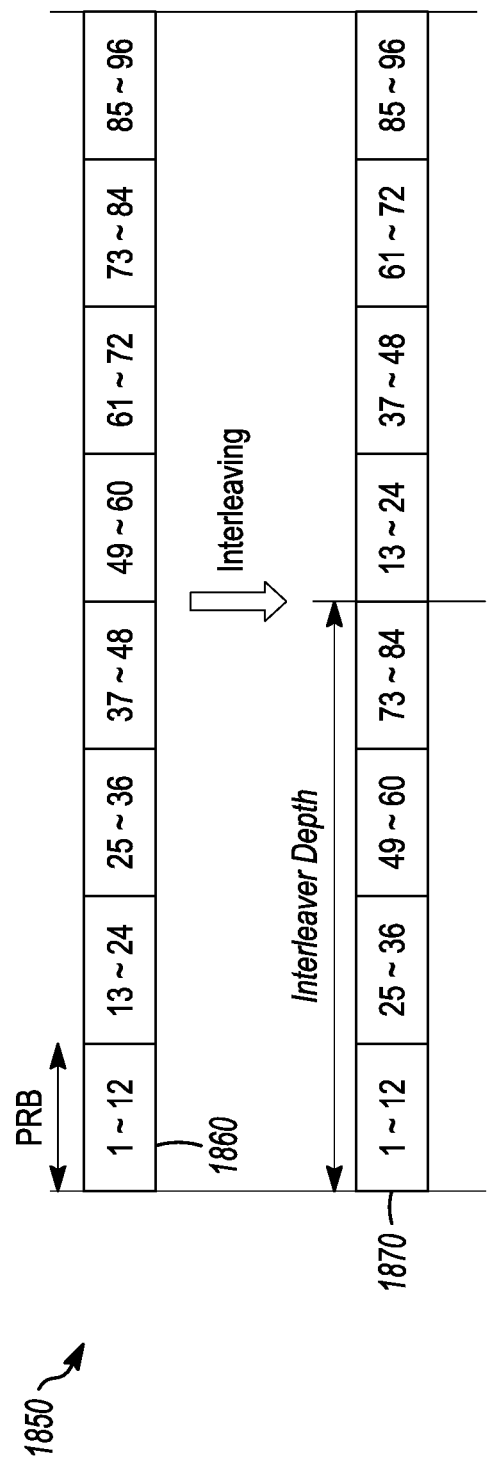
Figure 19A:
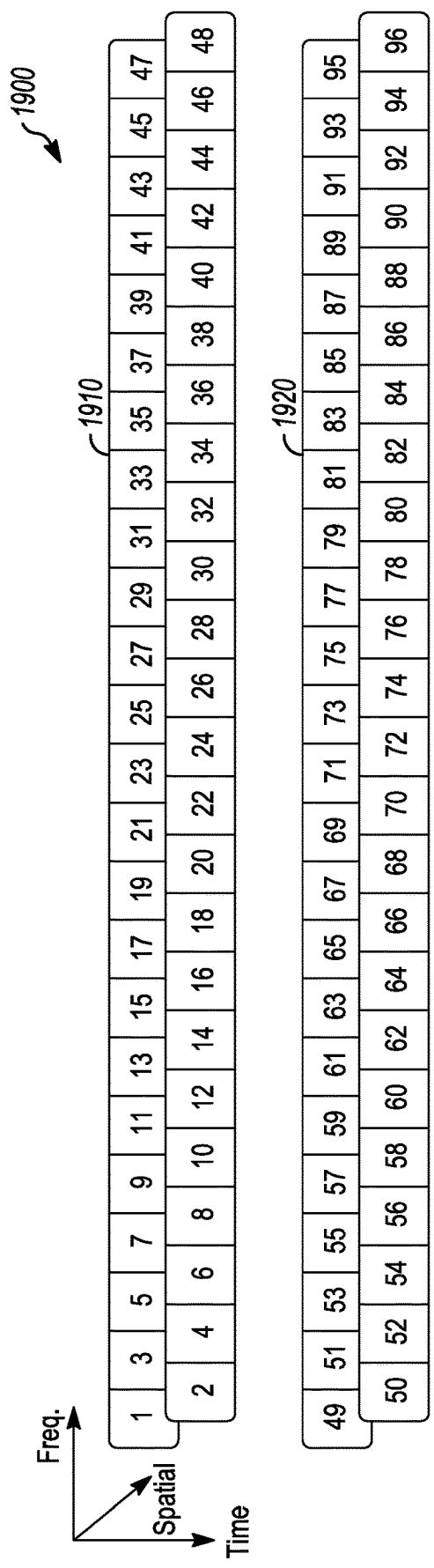
FIG. 19A and FIG. 19B illustrate additional examples of interleaving in accordance with some embodiments.
Figure 19B:
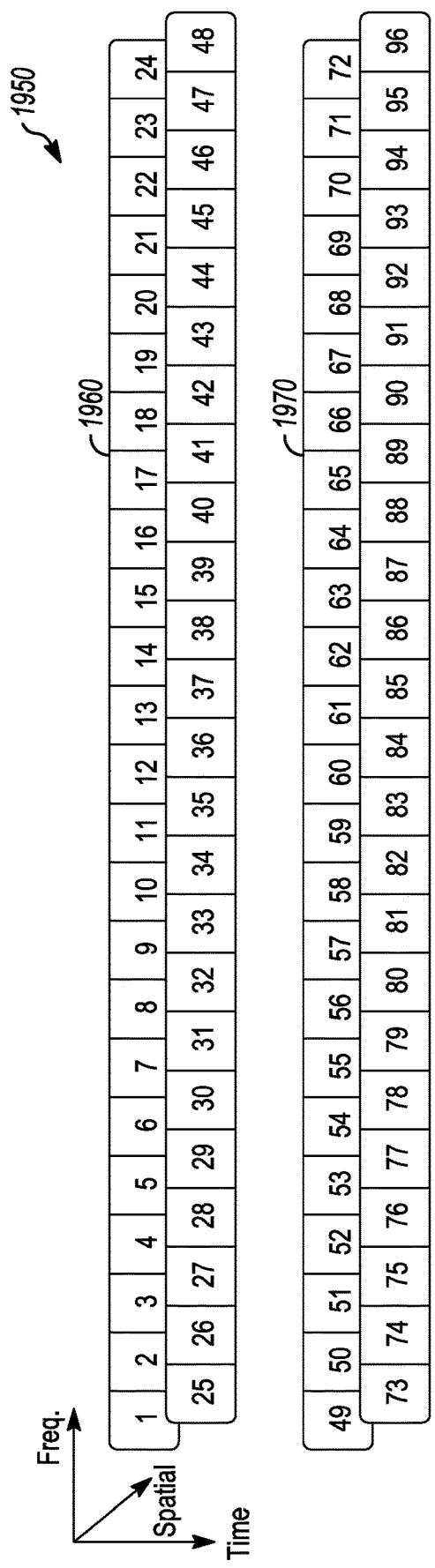
Figure 20A:
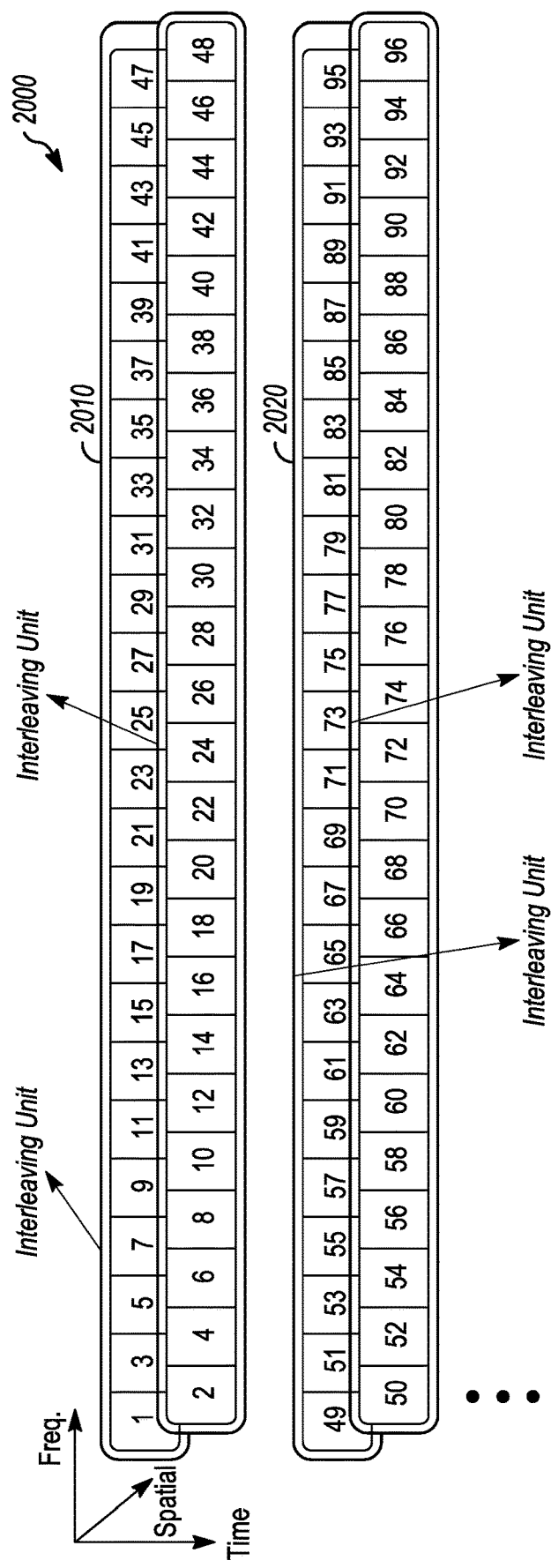
FIG. 20A and FIG. 20B illustrate additional examples of interleaving in accordance with some embodiments.
Figure 20B:
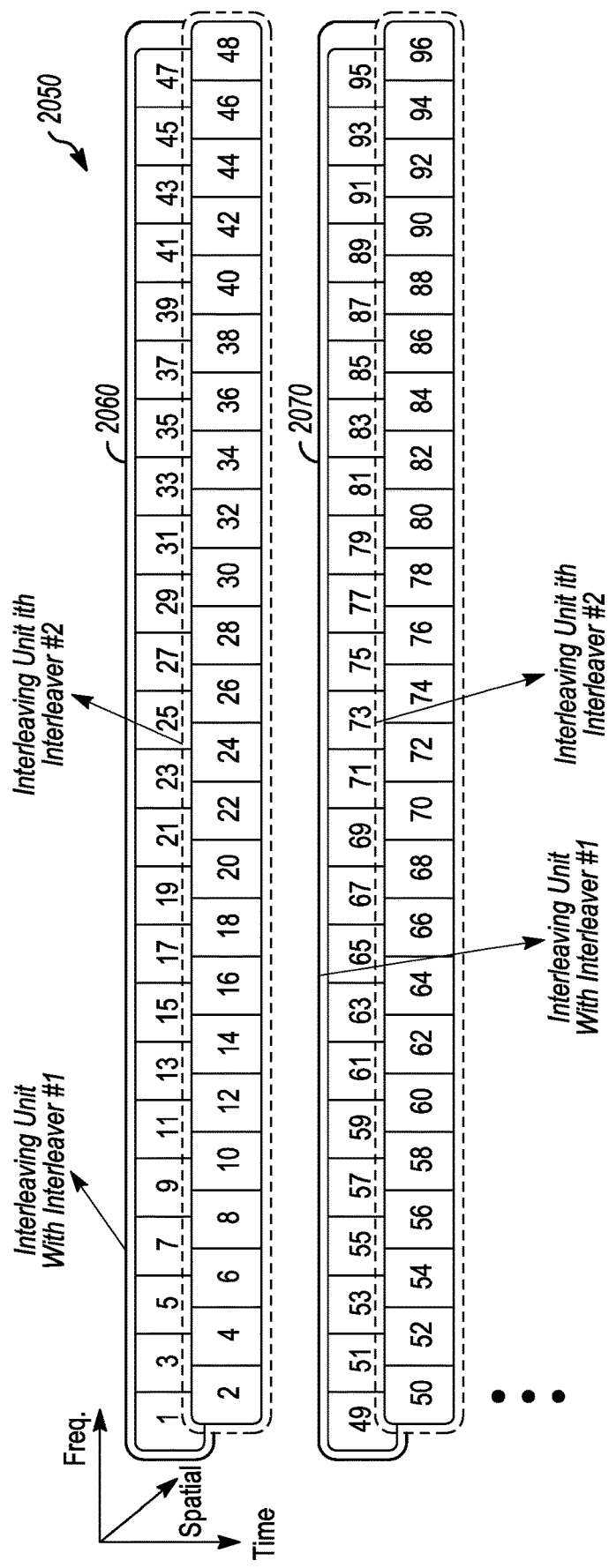
Figure 21A:
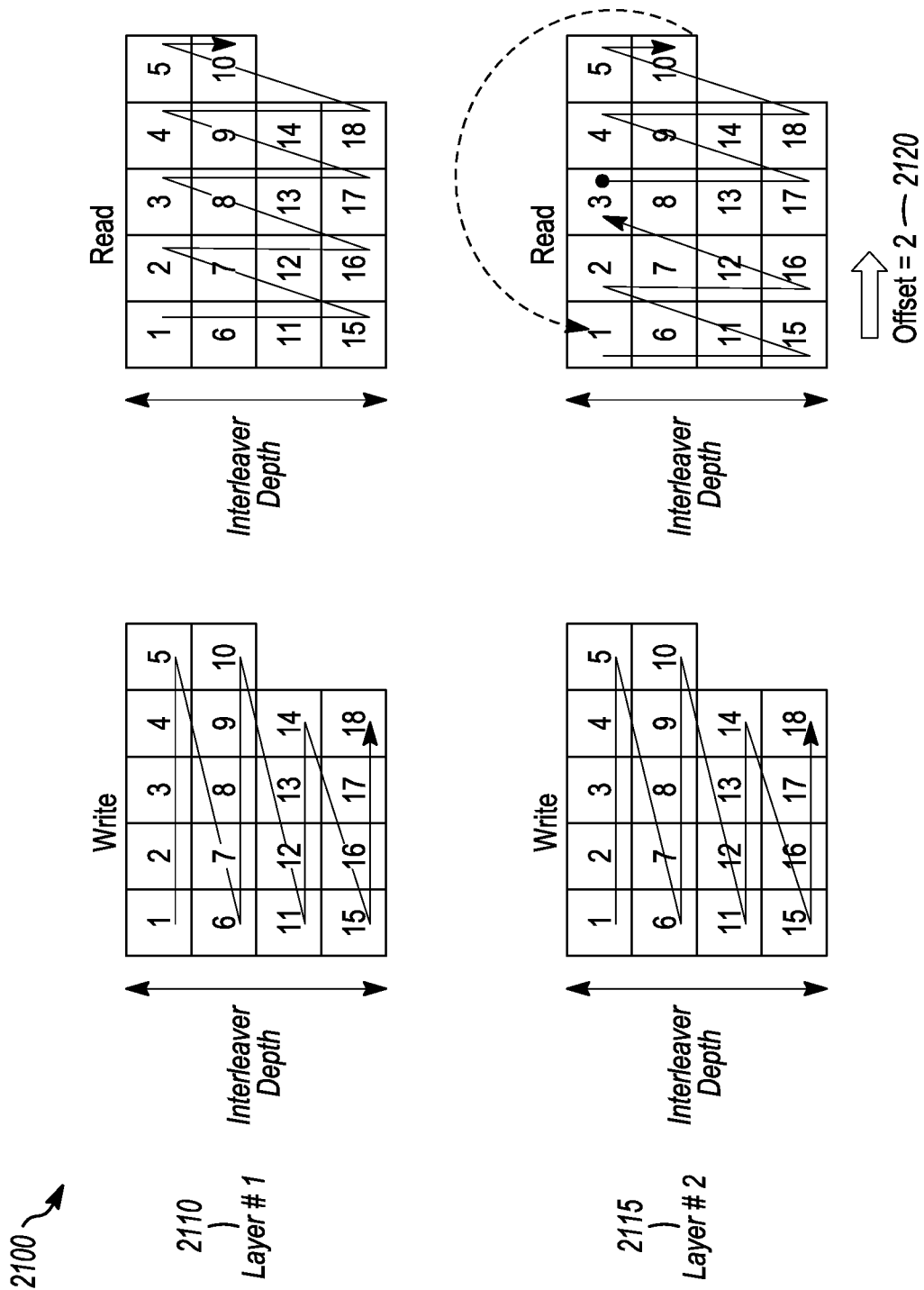
FIG. 21A and FIG. 21B illustrate additional examples of interleaving in accordance with some embodiments.
Figure 21B:
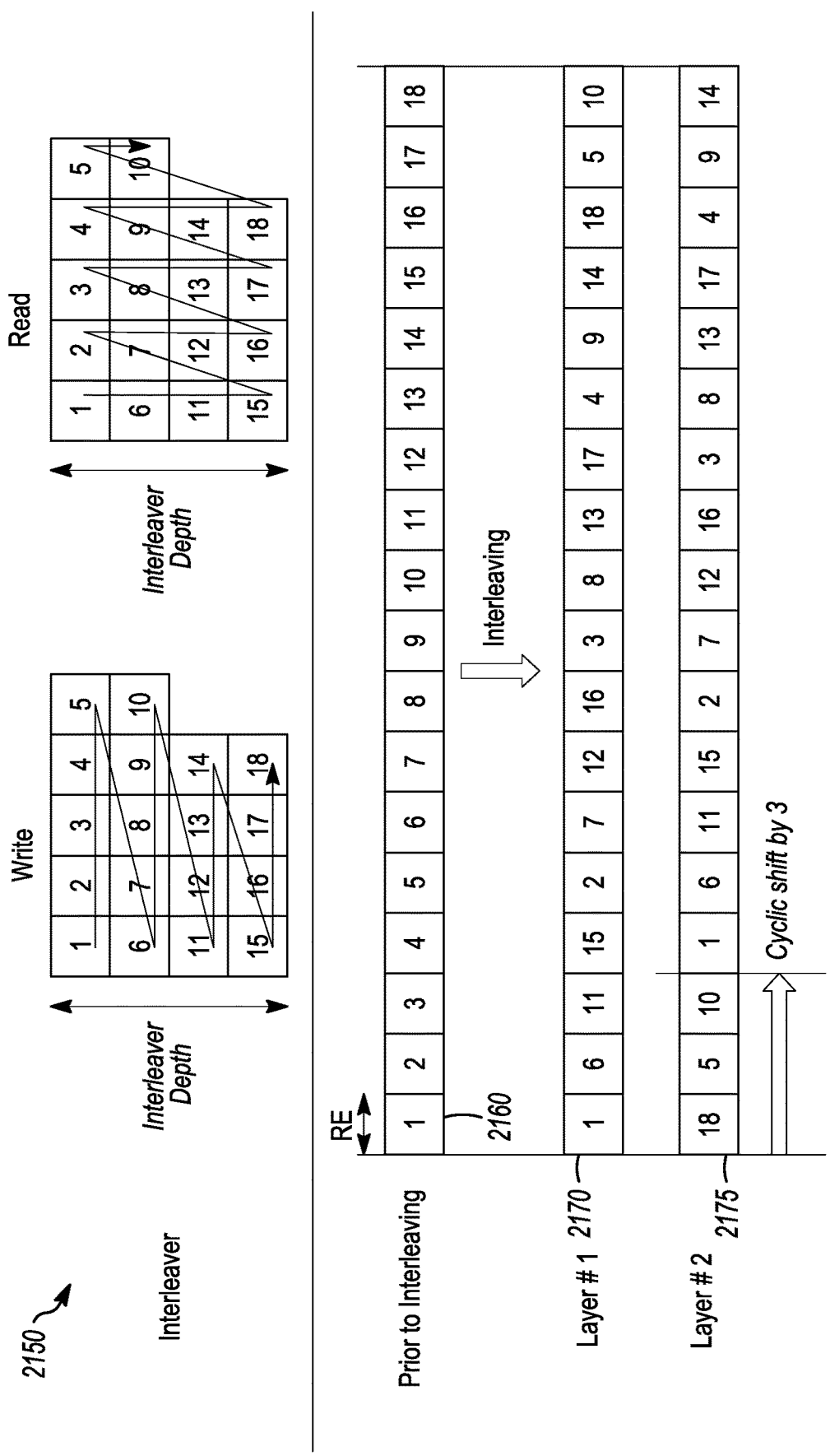
Figure 22A:
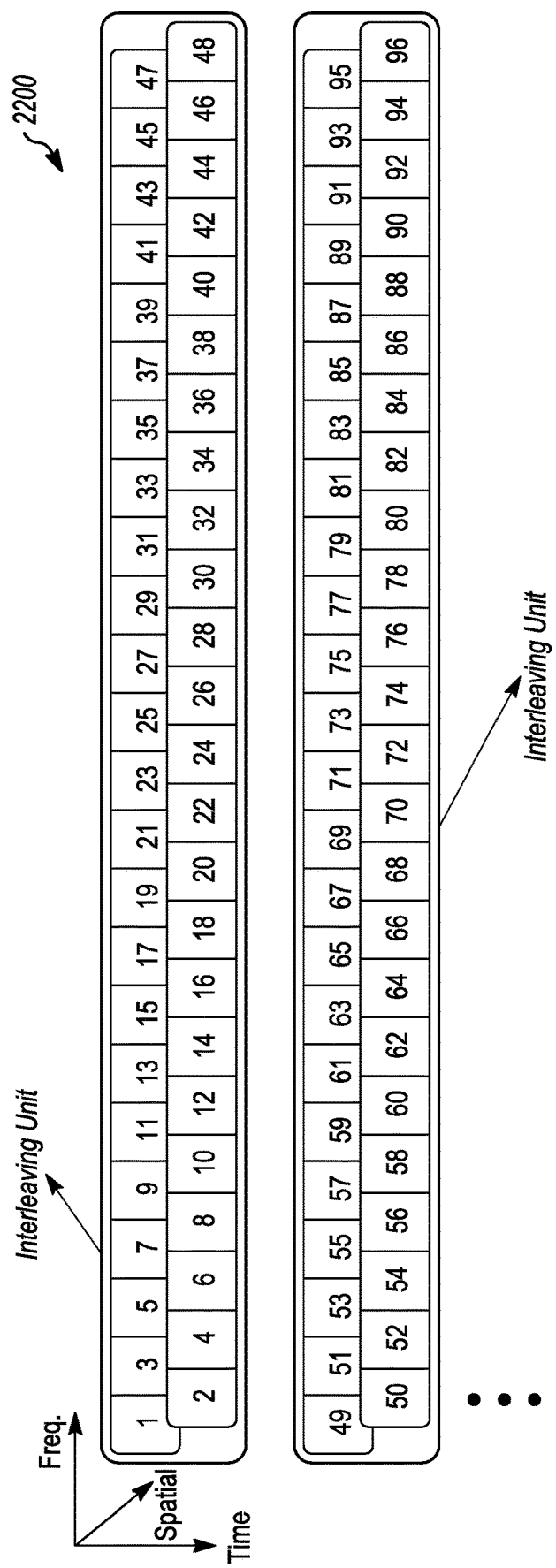
FIG. 22A and FIG. 22B illustrate additional examples of interleaving in accordance with some embodiments.
Figure 22B:
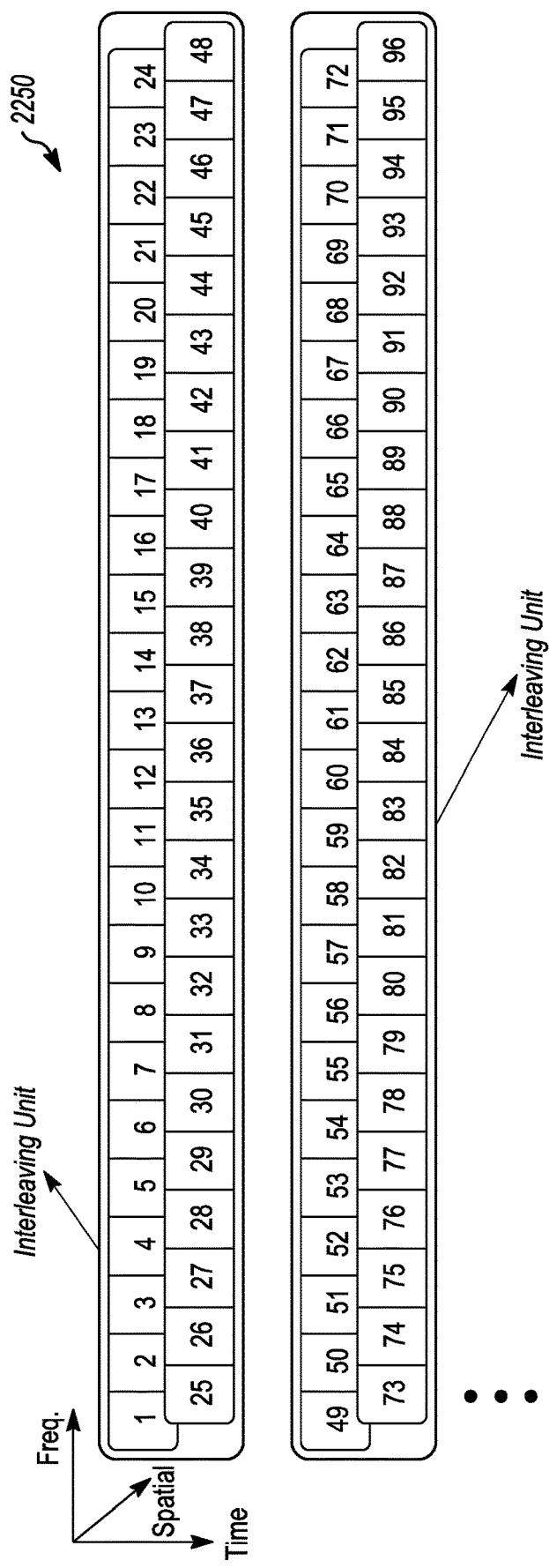

FIG. 10 illustrates an example of interleaving in accordance with some embodiments. FIG. 11 illustrates another example of interleaving in accordance with some embodiments. FIG. 12 illustrates another example of interleaving in accordance with some embodiments. FIG. 13 illustrates example code-blocks in accordance with some embodiments. FIG. 14 illustrates example interleaving units in accordance with some embodiments. FIG. 15A and FIG. 15B illustrate additional examples of interleaving in accordance with some embodiments. FIG. 16A and FIG. 16B illustrate additional examples of interleaving in accordance with some embodiments. FIG. 17A and FIG. 17B illustrate illustrates additional examples of interleaving in accordance with some embodiments. FIG. 18A and FIG. 18B illustrate additional examples of interleaving in accordance with some embodiments. FIG. 19A and FIG. 19B illustrate additional examples of interleaving in accordance with some embodiments. FIG. 20A and FIG. 20B illustrate additional examples of interleaving in accordance with some embodiments. FIG. 21A and FIG. 21B illustrate additional examples of interleaving in accordance with some embodiments. FIG. 22A and FIG. 22B illustrate additional examples of interleaving in accordance with some embodiments It should be noted that the examples shown in those figures may illustrate some or all of the concepts and techniques described herein in some cases, but embodiments are not limited by the examples. For instance, embodiments are not limited by the name, number, type, size, ordering, arrangement and/or other aspects of the operations, time resources, symbol periods, frequency resources, subcarriers, REs, interleaving units, spatial layers and other elements as shown in those figures. Although some of the elements shown in the examples of those figures may be included in a 3GPP LTE standard, 5G standard, NR standard and/or other standard, embodiments are not limited to usage of such elements that are included in standards.

In some embodiments, virtual resource blocks (VRBs) allocated to the UE 102 may be interleaved before mapping to physical resource blocks (PRBs). In a non-limiting example, an interleaving function may depend on an index of MIMO layers. In some cases, different interleaving patterns may result. Referring to FIG. 10, an example of interleaving of VRBs for two MIMO layers is shown. The example shown in FIG. 10 may be extended to more than two layers.

It should be noted that, depending on the MIMO layer index, the interleaving (including but not limited to interleaving for VRBs) may be different. After interleaving, the interleaved VRBs are mapped to PRBs in accordance with a resource allocation indication. In some embodiments, the VRB interleaving and the mapping to PRBs may be performed by one function (such as a combined function, joint function and/or other).

As indicated by 1000 for a first layer, VRBs 1010 may be interleaved (as indicated by 1015) to interleaved VRBs 1020. The interleaved VRBs 1020 may be mapped to PRBs 1030 (as indicted by 1025). In some embodiments, the VRBs 1010 and interleaved VRBs 1020 may be part of a logical domain 1035 and the PRBs 1030 may be part of a physical domain. It should be noted that usage of the "logical domain" and "physical domain" may be used for clarity, in some cases. Some embodiments may not necessarily include those domains. In some embodiments, a single function may be used to map symbols to the PRBs 1030, and some operations (such as 1015 and 1025) may not necessarily be performed explicitly. In some embodiments, a single function may be used to map VRBs 1010 to the PRBs 1030, and some operations (such as 1015 and 1025) may not necessarily be performed explicitly.

For a second layer 1050, VRBs 1060 may be interleaved (as indicated by 1065) to interleaved VRBs 1070. The interleaved VRBs 1070 may be mapped to PRBs 1080. In some embodiments, a first interleave pattern/operation used for 1015 may be different than a second interleave pattern/operation used for 1065. In some embodiments, an interleave pattern/operation for VRBs may be different for different layers.

In some embodiments, symbols (such as QAM symbols or other symbols) in the OFDM symbols allocated to the UE 102 may be interleaved before mapping to the PRBs. In a non-limiting example, such an interleaving function may depend on the indexes of the MIMO layers to achieve different interleaving patterns. Referring to FIG. 11, an example is shown, in which interleaving of symbols (such as QAM symbols or other symbols) within an OFDM symbol is shown for two MIMO layers. It should be noted that depending on the MIMO layer index, the interleaving may be different. In the first layer (indicated by 1100), symbols 1110 are interleaved to symbols 1120 as indicated by 1105. In the second layer (indicated by 1150), symbols 1160 are interleaved to symbols 1170 as indicated by 1155. In some embodiments, interleave operations 1105 and 1155 may be different. In some embodiments, interleave operations (such as 1105 and 1155) may depend on the layer. The example shown in FIG. 11 may be extended to more than two layers.

In some embodiments, interleaving may be performed in accordance with a block interleaving technique in which a size of a block is selected to have a number of elements greater than or equal to a number of elements of an interleaving sequence. In a non-limiting example, symbols (such as QAM symbols or other symbols) and/or VRBs may be written in the block in a row-by-row manner and may be read (and/or output) in a column-by-column manner. In another non-limiting example, the symbols (such as QAM symbols or other symbols) and/or VRBs may be written in the block in a column-by-column manner and may be read (and/or output) in a row-by-row manner. Embodiments are not limited to these implementations, however, as any suitable technique(s) may be used to implement the same or similar functionality.

In some embodiments, to further randomize an interleaving pattern, columns or rows of an interleaving block may be permuted (such as by a predetermined sequence and/or other technique(s)) before an output sequence is read. The permutation function of the columns or row may depend on the MIMO layer index. In the other embodiment the reading may start from the columns/rows depending on the MIMO layer index.

FIG. 12 shows an example of block interleaving, in which interleaving patterns may depend on the MIMO layer. In a first layer (as indicated by 1200), symbols 1210 may be written row-by-row (as indicated by 1225) and may be read column-by-column (as indicated by 1220). A permutation of columns (as indicated by 1205) may be performed between the write operation 1225 and read operation 1220. In a second layer (as indicated by 1250), symbols 1260 may be written row-by-row (as indicated by 1275) and may be read column-by-column (as indicated by 1270). A permutation of columns (as indicated by 1255) may be performed between the write operation 1275 and read operation 1270. In some embodiments, different permutation operations may be used for the different layers. In some embodiments, one or more layers (but not necessarily all layers) may use the permutation operation. In some embodiments, a single function may be used to interleave symbols in accordance with FIG. 12, and some operations, such as the read, write and/or permutation operations, may not necessarily be performed explicitly. The example of FIG. 12 may be extended to more than two layers.

It should be noted that the example described above and illustrated in FIG. 12 may use VRBs instead of symbols, in some embodiments. For instance, 1210 and 1260 may represent VRBs, in some embodiments, and one or more operations (such as 1220, 1225, 1205, 1270, 1275, 1255 and/or other(s)) may be applied to VRBs 1210 and VRBs 1260.

In some embodiments, a method may include interleaving of symbols (including but not limited to QAM symbols) in each OFDM symbol of a slot within a resource allocation of the UE 102. In some embodiments, the interleaving patterns for different MIMO layers of the same OFDM symbols may be different. In some embodiments, the interleaving may be performed by symbol groups (which may include QAM symbols and/or other symbols) associated with physical resource blocks (PRBs). In some embodiments, the interleaving may be applied to virtual resource blocks (VRBs) before mapping to physical resource blocks (PRBs). In some embodiments, the interleaving pattern may be determined by a block interleaver. The symbols (such as QAM symbols or other) may be written in the block interleaver row-by-row and may be read column-by-column. In some embodiments, columns of the block interleaver may be permuted before the output is read. In some embodiments, a permutation function may be dependent on the MIMO layer.

In some cases, including but not limited to LTE downlink transmission, a frequency-first time-second mapping of concatenated code-blocks (as shown in example 1300 in FIG. 13). This implies that when data information is large, it may be segmented into multiple blocks and each block may be encoded into a code-block. The code-blocks may be concatenated and mapped to allocated resources. The mapping may be performed such that all of the frequency resources of a OFDM symbol is fill in first before filling in resources of the next OFDM symbol (i.e. frequency-first time-second mapping). In the example scenario 1300 in FIG. 13, the data payload 1310 is divided into the code-blocks 1320, which are mapped to the resources as indicated by 1330. Accordingly, an OFDM symbol may include multiple codeblocks in a NR protocol. In contrast, an OFDM symbol may include a single codeblock in a protocol such as LTE.

In some cases, when an allocated bandwidth of the data is wide, different code-blocks may experience different channel gains due to frequency selectivity. For example, in frequency selective environments, code-blocks in one frequency range may have different average SINR compared to code-blocks in another frequency range. In some cases, this may create issues for reception of some code-blocks at the receiver, and may cause retransmission, by the transmitter, of some or all of the code-blocks of a data transport block.

In some embodiments, interleaving may effectively mix information bits of a code-block across the allocated bandwidth. This may result in a similar frequency diversity for some or all transmitted code-blocks, in some cases.

In some embodiments, modulated constellation symbols may be interleaved within each OFDM symbol (or within a consecutive OFDM symbols). Interleaving parameters may be determined by one or more of: a transport block size, a number of code-blocks in the transport block, an allocated number of spatial layers, a number of resource elements (RE) in each allocated OFDM symbols and/or other.

In some embodiments, interleaving may be performed at a bit level or at a modulated constellation symbol level. It should be noted that descriptions herein of techniques used for interleaving at the modulated constellation symbol level interleaving are not limiting. In some embodiments, interleaving at the bit level may be performed using one or more of the same techniques (and/or similar techniques) described herein for interleaving at the modulated constellation symbol level.

In some embodiments, interleaving may be performed within an "interleaving unit." The interleaving unit may be a group of time-frequency (and spatial layer) resources used to transport information from a same data transport block. Non-limiting example interleaving units 1410, 1420 are shown in FIG. 14.

In a non-limiting example, an interleaving unit may be all the frequency (and spatial layer) resources allocated for a data transport block and a single OFDM symbol. This may result in interleaving being performed for each OFDM symbol. This may be useful, in some cases, when channel conditions or interference conditions are not expected to fluctuate much between OFDM symbols. Interleaving across the entire allocated resources in each OFDM symbol may enable full frequency and spatial diversity to be achieved for each encoded code-block, in some cases.

In some cases, when a number of code-blocks is relatively small and a single OFDM symbol at any given transmission instant only carries bits from a single encoded code-block, interleaving may not necessarily be useful. In some embodiments, interleaving may be enabled dynamically based on transmission properties. For example, downlink control signaling may indicate enabling and disabling of the interleaving and/or indicate the interleaving unit dimensions. The signaling may be an explicit indication or may be implicitly derived by control information such as modulation code-rate, transport block size, allocated data REs, spatial layers (i.e. rank), a number of code-words, a number of code-blocks in the transport block and/or other information.

In some embodiments, block interleaving may be used. In block interleaving, interleaving elements may be written to a block in column-first row-second method. Interleaving elements may be read out from a block in row-first column-second method. Embodiments are not limited to this technique of writing and reading, however. Similar techniques described herein may performed using variations of these techniques. For instance, the elements may be written to the block in a row-first column second method and read in a column-first row second method. Examples of block interleaving are described below.

In some embodiments, when the number of interleaving elements is an integer multiple of a target interleaver depth, consecutive interleaving elements may be spaced apart by the interleaving depth. An example of such case is shown in 1500 of FIG. 15A, in which elements 1510 are interleaved to elements 1520.

In some embodiments, the target depth may be configured as the maximum depth for any two consecutive interleaving elements. The number of columns of the interleaving block may be determined by the length of all the interleaving elements divided by the target depth and rounded up to the nearest integer. Different sets of interleaving elements will have the target interleaving depth and target interleaving depth minus 1. An example is shown in 1550 in FIG. 15B, in which elements 1560 are interleaved to elements 1570 in accordance with the write operation (indicated by 1580) and the read operation (indicated by 1585).

In some embodiments, a target depth may be configured as the depth for any two consecutive interleaving elements. There may be two different values of the number of columns of the interleaving block. The two numbers of columns of the interleaving block may be determined by a length of all the interleaving elements divided by the target depth and rounded up and rounded down to the nearest integer, respectively. An example is shown in 1600 in FIG. 16A, in which elements 1610 are interleaved to elements 1620 in accordance with the write operation (indicated by 1630) and the read operation (indicated by 1635).

In some embodiments, the target depth may be configured as the depth for two consecutive interleaving non-orphan elements. An example of orphan elements is shown in 1650 of FIG. 16B, in which elements 1660 are interleaved to elements 1670 in accordance with the write operation (indicated by 1680) and the read operation (indicated by 1685). The two orphan elements 1690 (numbered 17 and 18 in this example) are shown in FIG. 16B. In this example, all of the elements except the orphan elements are interleaved using a block interleaving. The orphan elements 1690 are read out after the other interleaved elements are read out. Another example of orphan elements is shown in 1700 in FIG. 17A, in which elements 1710 are interleaved to elements 1720 in accordance with the write operation (indicated by 1730) and the read operation (indicated by 1735). All elements except the orphan elements 1740 are written into a block and the orphan elements 1740 are written to the last row of the block. The orphan elements 1740 are distributed across different columns of the interleaving block. The output elements are read out from the interleaving block using the row-first and column-second method.

It should be noted that the write and read operations described herein for block interleaving may not necessarily be write and read of memory values in the device, but logical operations for the interleaving process. In some cases, writing and reading of actual memory content may not necessarily take place during the interleaving process. In some embodiments, the device may identify the output element indexing in order to take the output of the interleaver for further processing.

In some embodiments, empty interleaving elements of the interleaver block may be positioned at the end of the interleaving unit (such as in the examples 1650 and 1700). However, the empty interleaving elements may be placed in the beginning of the interleaving unit, in some embodiments. An example is shown in 1750 in FIG. 17B, in which elements 1760 are interleaved to elements 1770 in accordance with the write operation (indicated by 1780) and the read operation (indicated by 1785). Another example is shown in 1800 in FIG. 18A, in which elements 1810 are interleaved to elements 1820 in accordance with the write operation (indicated by 1830) and the read operation (indicated by 1835).

In some embodiments, interleaving may be performed in block units of physical resource blocks (PRB). In some embodiments, PRBs may be aggregate of REs in frequency (and possibly spatial layer) domain within a fixed frequency interval. In some cases, an interleaving element may be a PRB (or an integer number of PRBs). An example of PRB level interleaving is shown in 1850 in FIG. 18B. The numbers in each box of 1850 indicate RE indices.

In some embodiments, a data transport block may be mapped to multiple spatial layers (i.e. multi-rank transmission). The RE mapping structure may impact the interleaver design, in some cases. The RE mapping structure is the order in which modulated constellation symbols are mapped to physical REs. One example of the RE mapping structure is frequency-first and time-second mapping when there is only 1 spatial layer. For multiple layer mapping, spatial-first, frequency-second, and time-third mapping is one approach. Another approach is frequency-first, spatial-second, and time-third mapping rule. The examples of the two approaches are shown in 1900 in FIG. 19A and 1950 in FIG. 19B, respectively.

Some methods of interleaving presented below, and may be applied to various RE mapping approaches (including but not limited to the two RE mapping techniques described above and illustrated in FIG. 19A and FIG. 19B). In some embodiments, a same interleaving per spatial layer may be used. Interleaving may be performed for each spatial layer separately, and an identical interleaving procedure may be performed for each spatial layer. The spatial layer REs corresponding to the same time-frequency index may be interleaved as a group. An example of this shown in 2000 in FIG. 20A. The units 2010 are interleaved to the units 2020. In the example 2000, a spatial-first, frequency-second, and time-third RE mapping is used. The interleaving unit is 1 OFDM symbol in the example 2000, but this is an example, and it is understood that other interleaving units (including but not limited to those described herein) may be used.

In some embodiments, spatial layer specific interleaving per spatial layer may be used. In some embodiments, interleaving may be performed for each spatial layer separately, and a different interleaving procedure may be performed for each spatial layer. In this method, the spatial layer REs corresponding to the same time-frequency index may be interleaved and may be randomized. In contrast to the above example (illustrated in 2000), if a spatial-first, frequency-second RE mapping rule is used, consecutive REs from a same code-block may potentially be separated into different frequency indices. An example 2050 is shown in FIG. 20B. In 2050, a spatial-first, frequency-second, and time-third RE mapping is used. The units 2060 are interleaved to the units 2070. The interleaving unit is 1 OFDM symbol in the example 2050, but this is an example, and it is understood that other interleaving units (including but not limited to those described herein) may be used.

In some embodiments, usage of different interleaving for different spatial layers may be implemented in different ways. One method is to use a column offset value when reading the interleaving elements from the interleaving block. An example of the column offset for different layer is shown in 2100 in FIG. 21A. In the example 2100, the column offset for layer #1 (indicated by 2110) is set to 0, and for layer #2 (indicated by 2115) a column offset of 2 is used (as indicated by 2120). The column offset of N means that (N+1)-th column of the interleaving element is read out first. When the last column is read out from the interleaver block and there still interleaver elements that have not been read out, then the rest of the columns of the interleaver block may be read out starting from the first column.

In some embodiments, a different interleaving may be performed by performance of a cyclic shift of the output of the interleaver process. The spatial layers may use the same interleaving process, but outputs of the interleaving may be cyclically shifted by different offsets for different spatial layers. An example is shown in 2150 in FIG. 21B, in which units 2160 are interleaved to units 2170 in the first layer (layer #1). In the second layer (indicated by layer #2), a cyclic shift of 3 is used (as indicated by 2180) to give the outputs 2175. The spatial layers may use the same interleaving process, but outputs of the interleaving may be cyclically shifted by different offsets for different spatial layers.

In some embodiments, a single interleaving process may be applied across multiple spatial layers. Interleaving may be performed across all REs belonging to all spatial layers (used by the transport block). The REs of different spatial layers may be logically concatenated into one stream and then interleaving may be performed over this one stream of REs. Depending on whether the RE mapping is based on spatial-first, frequency-second or frequency-first spatial-second approach, interleaving results may be different. Examples 2200, 2250 of this method are shown in FIG. 22A and FIG. 22B.

In some embodiments, a target interleaver depth may be fixed (such as in a standard and/or specification). In some embodiments, the target interleaver depth may be defined as a function of control signals, transmission properties and/or other. Examples of control signal and/or transmission properties include, but are not limited to, the following: a number of code-blocks, a maximum number of code-blocks in any allocated OFDM symbol, an average number of code-blocks in an OFDM symbol, an assigned number of PRBs in frequency domain, a data transport block size, a modulation and coding scheme (MCS), a transmit rank (i.e. number of spatial layers of the data transport block) and/or other. In some cases, it may be possible to derive the number of code-blocks and code-block related parameters from control signal and transmission properties.

In Example 1, an apparatus of a Generation Node-B (gNB) may comprise memory. The apparatus may further comprise processing circuitry. The processing circuitry may be configured to map data symbols to resource elements (REs) of virtual resource blocks (VRBs). The processing circuitry may be further configured to interleave the data symbols, on a per-VRB basis, to spatial layers of a multi-layer multiple-input multiple-output (MIMO) transmission. The data symbols may be interleaved based on different interleave patterns of VRB indexes for the spatial layers. The processing circuitry may be further configured to map the interleaved data symbols of the spatial layers to REs of physical resource blocks (PRBs) for orthogonal frequency division multiplexing (OFDM) transmission. The memory may be configured to store the data symbols.

In Example 2, the subject matter of Example 1, wherein the data symbols may include multiple codeblocks. The processing circuitry may be further configured to map the interleaved data symbols to the REs of PRBs in one OFDM symbol for the OFDM transmission.

In Example 3, the subject matter of one or any combination of Examples 1-2, wherein the VRBs may include predetermined pluralities of REs. At least some of the VRBs may include non-contiguous REs. The PRBs may include predetermined pluralities of contiguous REs.

In Example 4, the subject matter of one or any combination of Examples 1-3, wherein the processing circuitry may be further configured to map the interleaved data symbols of the spatial layers to the REs of the PRBs based on a predetermined mapping between interleaved VRB indexes and PRB indexes.

In Example 5, the subject matter of one or any combination of Examples 1-4, wherein the interleave patterns of VRB indexes may be mapped to indexes of the spatial layers in accordance with a predetermined mapping.

In Example 6, the subject matter of one or any combination of Examples 1-5, wherein the interleave patterns of VRB indexes may be predetermined based on a diversity gain that is based on a correlation between the spatial layers.

In Example 7, the subject matter of one or any combination of Examples 1-6, wherein the gNB may be arranged to operate in accordance with a new radio (NR) protocol.

In Example 8, the subject matter of one or any combination of Examples 1-7, wherein the processing circuitry may include a baseband processor to interleave the data symbols.

In Example 9, the subject matter of one or any combination of Examples 1-8, wherein the apparatus may further include a transceiver to perform the OFDM transmission.

In Example 10, a computer-readable storage medium may store instructions for execution by one or more processors to perform operations for communication by a Generation Node-B (gNB). The operations may configure the one or more processors to encode data symbols for orthogonal frequency division multiplexing (OFDM) transmission in a first spatial layer of a multi-layer MIMO transmission. The data symbols may be mapped to resource elements (REs) based on a first interleave pattern between data symbol indexes and RE indexes. The operations may further configure the one or more processors to encode the data symbols for OFDM transmission in a second spatial layer of the multi-layer MIMO transmission. The data symbols may be mapped to the REs based on a second interleave pattern between the data symbol indexes and the RE indexes. The first interleave pattern may be for the first spatial layer, the second interleave pattern may be for the second spatial layer, and the first and second interleave patterns may be different.

In Example 11, the subject matter of Example 10, wherein the data symbols may include multiple codeblocks. The operations may further configure the one or more processors to map the interleaved data symbols to the REs in one OFDM symbol for the OFDM transmission.

In Example 12, the subject matter of one or any combination of Examples 10-11, the subject matter of Example 9, wherein the first and second interleave patterns may be based on a block interleave matrix configurable for inputs on a per-row basis and for outputs on a per-column basis. The first interleave pattern may be based on a first permutation of rows of the block interleave matrix. The second interleave pattern may be based on a second permutation of the rows of the block interleave matrix.

In Example 13, the subject matter of one or any combination of Examples 10-12, wherein the first and second interleave patterns may be based on a block interleave matrix configurable for inputs on a per-row basis and for outputs on a per-column basis. The first interleave pattern may be based on a first permutation of columns of the block interleave matrix. The second interleave pattern may be based on a second permutation of the columns of the block interleave matrix.

In Example 14, the subject matter of one or any combination of Examples 10-13, wherein the first and second interleave patterns may be based on a block interleave matrix configurable for inputs on a per-row basis and for outputs on a per-column basis. The first interleave pattern may be based on a first start column for the outputs. The second interleave pattern may be based on a second start column for the outputs.

In Example 15, the subject matter of one or any combination of Examples 10-14, wherein the first and second interleave patterns may be based on a block interleave matrix configurable for inputs on a per-row basis and for outputs on a per-column basis. The operations may further configure the one or more processors to, if a number of the data symbols is not a multiple of a number of rows of the block interleave matrix and a number of columns of the block interleave matrix: divide the data symbols to include first data symbols of size equal to an integer number of rows for the block interleave matrix and second data symbols that includes one or more orphan data symbols; and determine the outputs based on the first data symbols written in a row-wise manner to a plurality of rows, the orphan data symbols written in a row wise manner to another row after the plurality of rows, and the first data symbols read from the plurality of rows in a column-wise manner appended by the orphan data symbols.

In Example 16, the subject matter of one or any combination of Examples 10-15, wherein the first and second interleave patterns may be based on a block interleave matrix configurable for inputs on a per-row basis and for outputs on a per-column basis. The operations may further configure the one or more processors to, if a number of the data symbols is not a multiple of a number of rows of the block interleave matrix and a number of columns of the block interleave matrix, the processing circuitry is further configured to: divide the data symbols to include a first data symbols of size equal to an integer number of rows for the block interleave matrix and second data symbols that includes one or more orphan data symbols; and determine the outputs based on the first data symbols written in a row-wise manner to a plurality of rows, the orphan data symbols written to one or more elements of another row after the plurality of rows, and the first data symbols and the orphan data symbols read from the plurality of rows in a column-wise manner.

In Example 17, the subject matter of one or any combination of Examples 10-16, wherein the first and second interleave patterns may be based on a block interleave matrix configurable for inputs on a per-row basis and for outputs on a per-column basis. The first interleave pattern may be based on a first read index for the outputs. The first read index may be equal to a row and/or column within the block interleave matrix. The second interleave pattern may be based on a second read index for the outputs. The second read index may be offset from the first read index by a predetermined amount.

In Example 18, the subject matter of one or any combination of Examples 10-17, wherein the operations may further configure the one or more processors to encode the data symbols for OFDM transmission in one or more additional spatial layers of the multi-layer MIMO transmission. An interleave pattern between the data symbol indexes and the RE indexes for at least one of the additional spatial layers may be different from the first and second interleave patterns.

In Example 19, an apparatus of a User Equipment (UE) may comprise memory. The apparatus may further comprise processing circuitry. The processing circuitry may be configured to encode data symbols for orthogonal frequency division multiplexing (OFDM) transmission in multiple spatial layers of a multi-layer MIMO transmission. The data symbols may be mapped to resource elements (REs) of physical resource blocks (PRBs) based on a predetermined mapping between the data symbols and REs of a plurality of virtual resource blocks (VRBs), interleave patterns of VRB indexes for the spatial layers, wherein the interleave patterns for at least two of the spatial layers are different, and a predetermined mapping between interleaved VRB indexes and PRB indexes. The memory may be configured to store the data symbols.

In Example 20, the subject matter of Example 19, wherein the data symbols may include multiple codeblocks. The operations may further configure the one or more processors to encode the data symbols for OFDM transmission in one OFDM symbol.

In Example 21, the subject matter of one or any combination of Examples 19-20, wherein the VRBs may include predetermined pluralities of REs. At least some of the VRBs may include non-contiguous REs. The PRBs may include predetermined pluralities of contiguous REs.

In Example 22, an apparatus of a Generation Node-B (gNB) may comprise means for encoding data symbols for orthogonal frequency division multiplexing (OFDM) transmission in a first spatial layer of a multi-layer MIMO transmission. The data symbols may be mapped to resource elements (REs) based on a first interleave pattern between data symbol indexes and RE indexes. The apparatus may further comprise means for encoding the data symbols for OFDM transmission in a second spatial layer of the multi-layer MIMO transmission. The data symbols may be mapped to the REs based on a second interleave pattern between the data symbol indexes and the RE indexes. The first interleave pattern may be for the first spatial layer, the second interleave pattern may be for the second spatial layer, and the first and second interleave patterns may be different.

In Example 23, the subject matter of Example 22, wherein the data symbols may include multiple codeblocks. The apparatus may further comprise means for mapping the interleaved data symbols to the REs in one OFDM symbol for the OFDM transmission.

In Example 24, the subject matter of one or any combination of Examples 22-23, wherein the first and second interleave patterns may be based on a block interleave matrix configurable for inputs on a per-row basis and for outputs on a per-column basis. The first interleave pattern may be based on a first permutation of rows of the block interleave matrix. The second interleave pattern may be based on a second permutation of the rows of the block interleave matrix.

In Example 25, the subject matter of one or any combination of Examples 22-24, wherein the first and second interleave patterns may be based on a block interleave matrix configurable for inputs on a per-row basis and for outputs on a per-column basis. The first interleave pattern may be based on a first permutation of columns of the block interleave matrix. The second interleave pattern may be based on a second permutation of the columns of the block interleave matrix.

In Example 26, the subject matter of one or any combination of Examples 22-25, wherein the first and second interleave patterns may be based on a block interleave matrix configurable for inputs on a per-row basis and for outputs on a per-column basis. The first interleave pattern may be based on a first start column for the outputs. The second interleave pattern may be based on a second start column for the outputs.

In Example 27, the subject matter of one or any combination of Examples 22-26, wherein the first and second interleave patterns may be based on a block interleave matrix configurable for inputs on a per-row basis and for outputs on a per-column basis. The apparatus may further comprise means for, if a number of the data symbols is not a multiple of a number of rows of the block interleave matrix and a number of columns of the block interleave matrix: dividing the data symbols to include first data symbols of size equal to an integer number of rows for the block interleave matrix and second data symbols that includes one or more orphan data symbols; and determining the outputs based on the first data symbols written in a row-wise manner to a plurality of rows, the orphan data symbols written in a row wise manner to another row after the plurality of rows, and the first data symbols read from the plurality of rows in a column-wise manner appended by the orphan data symbols.

In Example 28, the subject matter of one or any combination of Examples 22-27, wherein the first and second interleave patterns may be based on a block interleave matrix configurable for inputs on a per-row basis and for outputs on a per-column basis. The apparatus may further comprise means for, if a number of the data symbols is not a multiple of a number of rows of the block interleave matrix and a number of columns of the block interleave matrix: dividing the data symbols to include a first data symbols of size equal to an integer number of rows for the block interleave matrix and second data symbols that includes one or more orphan data symbols; and determining the outputs based on the first data symbols written in a row-wise manner to a plurality of rows, the orphan data symbols written to one or more elements of another row after the plurality of rows, and the first data symbols and the orphan data symbols read from the plurality of rows in a column-wise manner.

In Example 29, the subject matter of one or any combination of Examples 22-28, wherein the first and second interleave patterns may be based on a block interleave matrix configurable for inputs on a per-row basis and for outputs on a per-column basis. The first interleave pattern may be based on a first read index for the outputs, the first read index equal to a row and/or column within the block interleave matrix. The second interleave pattern may be based on a second read index for the outputs, the second read index offset from the first read index by a predetermined amount.

In Example 30, the subject matter of one or any combination of Examples 22-29, wherein the apparatus may further comprise means for encoding the data symbols for OFDM transmission in one or more additional spatial layers of the multi-layer MIMO transmission. An interleave pattern between the data symbol indexes and the RE indexes for at least one of the additional spatial layers may be different from the first and second interleave patterns.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a Generation Node-B (gNB), the apparatus comprising:
   memory; and processing circuitry, configured to:
      map data symbols to resource elements (REs) of virtual resource blocks (VRBs);
      interleave the data symbols, on a per-VRB basis, to spatial layers of a multi-layer multiple-input multiple-output (MIMO) transmission,
      wherein the data symbols are interleaved based on different interleave patterns of VRB indexes for the spatial layers; and
      map the interleaved data symbols of the spatial layers to REs of physical resource blocks (PRBs) for orthogonal frequency division multiplexing (OFDM) transmission,
      wherein the memory is configured to store the data symbols.

2. The apparatus according to claim 1, wherein:
   the data symbols include multiple codeblocks, and
   the processing circuitry is further configured to map the interleaved data symbols to the REs of PRBs in one OFDM symbol for the OFDM transmission.

3. The apparatus according to claim 1, wherein:
   the VRBs include predetermined pluralities of REs,
   at least some of the VRBs include non-contiguous REs, and
   the PRBs include predetermined pluralities of contiguous REs.

4. The apparatus according to claim 1, the processing circuitry further configured to:

map the interleaved data symbols of the spatial layers to the REs of the PRBs based on a predetermined mapping between interleaved VRB indexes and PRB indexes.

5. The apparatus according to claim 1, wherein the interleave patterns of VRB indexes are mapped to indexes of the spatial layers in accordance with a predetermined mapping.

6. The apparatus according to claim 1, wherein the interleave patterns of VRB indexes are predetermined based on a diversity gain that is based on a correlation between the spatial layers.

7. The apparatus according to claim 1, wherein the gNB is arranged to operate in accordance with a new radio (NR) protocol.

8. The apparatus according to claim 1, wherein the processing circuitry includes a baseband processor to interleave the data symbols.

9. The apparatus according to claim 1, wherein the apparatus further includes a transceiver to perform the OFDM transmission.

10. An apparatus of a User Equipment (UE), the apparatus comprising:
    memory; and processing circuitry, configured to:
        encode data symbols for orthogonal frequency division multiplexing (OFDM) transmission in multiple spatial layers of a multi-layer MIMO transmission, the data symbols mapped to resource elements (REs) of physical resource blocks (PRBs) based on:
        a predetermined mapping between the data symbols and REs of a plurality of virtual resource blocks (VRBs),
        interleave patterns of VRB indexes for the spatial layers, wherein the interleave patterns for at least two of the spatial layers are different, and
        a predetermined mapping between interleaved VRB indexes and PRB indexes,
    wherein the memory is configured to store the data symbols.

11. The apparatus according to claim 10, wherein:
the data symbols include multiple codeblocks, and
the processing circuitry is further configured to encode the data symbols for OFDM transmission in one OFDM symbol.

12. The apparatus according to claim 10, wherein:
the VRBs include predetermined pluralities of REs,
at least some of the VRBs include non-contiguous REs, and
the PRBs include predetermined pluralities of contiguous REs.

* * * * *